(12) United States Patent
Yao et al.

(10) Patent No.: US 12,271,325 B2
(45) Date of Patent: Apr. 8, 2025

(54) SYSTEM MANAGEMENT MODE RUNTIME RESILIENCY MANAGER

(71) Applicant: Intel Corporation, Santa Clara, CA (US)

(72) Inventors: Jiewen Yao, Shanghai (CN); Vincent Zimmer, Issaquah, WA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/703,050

(22) Filed: Mar. 24, 2022

(65) Prior Publication Data
US 2023/0013235 A1   Jan. 19, 2023

Related U.S. Application Data

(63) Continuation of application No. PCT/CN2021/106444, filed on Jul. 15, 2021.

(30) Foreign Application Priority Data

Jul. 15, 2021   (WO) ................ PCT/CN2021/106444

(51) Int. Cl.
*G06F 21/57*   (2013.01)
*G06F 8/65*   (2018.01)
(Continued)

(52) U.S. Cl.
CPC ............. *G06F 13/24* (2013.01); *G06F 8/65* (2013.01); *G06F 9/44594* (2013.01);
(Continued)

(58) Field of Classification Search
CPC ............. G06F 11/2025; G06F 9/4411; G06F 9/45558; G06F 9/4812; G06F 9/44594;
(Continued)

(56) References Cited

U.S. PATENT DOCUMENTS 5,630,141 A * 5/1997 Ross ..................... G06F 9/4812
                                                     710/48
5,768,620 A * 6/1998 Johnson ................ G06F 13/24
                                                     710/48
(Continued)

FOREIGN PATENT DOCUMENTS

CN          107209669 A        9/2017

OTHER PUBLICATIONS

JP 5125786, (translation), Jan. 23, 2013, 17 pgs < JP_5125786.pdf>.*
(Continued)

*Primary Examiner* — Tuan A Vu
(74) *Attorney, Agent, or Firm* — Alliance IP, LLC

(57) ABSTRACT

A system management mode (SMM) runtime resiliency manager (SRM) augments computing resource protection policies provided by an SMM policy shim. The SMM shim protects system resources by depriviledging system management interrupt (SMI) handlers to a lower level of privilege (e.g., ring 3 privilege) and by configuring page tables and register bitmaps (e.g., I/O, MSR, and Save State register bitmaps). SRM capabilities include protecting the SMM shim, updating the SMM shim, protecting a computing system during SMM shim update, detecting SMM attacks, and recovering attacked or faulty SMM components.

20 Claims, 15 Drawing Sheets

(51) Int. Cl.
  *G06F 9/445* (2018.01)
  *G06F 9/455* (2018.01)
  *G06F 9/48* (2006.01)
  *G06F 12/14* (2006.01)
  *G06F 13/24* (2006.01)
  *G06F 21/62* (2013.01)
  *G06F 21/56* (2013.01)

(52) U.S. Cl.
  CPC ........ *G06F 9/45558* (2013.01); *G06F 9/4812* (2013.01); *G06F 12/1408* (2013.01); *G06F 21/57* (2013.01); *G06F 21/62* (2013.01); *G06F 21/566* (2013.01); *G06F 21/572* (2013.01); *G06F 2221/2113* (2013.01)

(58) Field of Classification Search
  CPC ............. G06F 2221/2113; G06F 21/62; G06F 21/566; G06F 12/1408; G06F 8/65; G06F 8/656; G06F 11/0715; G06F 21/572; G06F 13/24; G09C 5/36
  See application file for complete search history.

(56) References Cited

U.S. PATENT DOCUMENTS

| | | | |
|---|---|---|---|
| 5,802,365 A * | 9/1998 | Kathail | G06F 9/4411 719/321 |
| 6,269,478 B1 * | 7/2001 | Lautenbach-Lampe | G06F 11/0715 714/E11.003 |
| 7,260,848 B2 | 8/2007 | Zimmer | |
| 10,776,283 B2 | 9/2020 | Brannock et al. | |
| 11,106,457 B1 * | 8/2021 | Subramanian | G06F 8/656 |
| 2005/0154870 A1 | 7/2005 | Martínez et al. | |
| 2006/0224808 A1 | 10/2006 | Depew et al. | |
| 2008/0040710 A1 * | 2/2008 | Chiriac | G06F 21/566 717/136 |
| 2008/0162988 A1 * | 7/2008 | Zorek | G06F 11/2025 714/13 |
| 2008/0278508 A1 * | 11/2008 | Anderson | G09G 5/36 345/519 |
| 2010/0169968 A1 * | 7/2010 | Shanbhogue | G06F 12/1408 711/E12.002 |
| 2012/0260082 A1 * | 10/2012 | Bobzin | G06F 21/572 713/100 |
| 2018/0247082 A1 * | 8/2018 | Durham | G06F 9/45558 |
| 2019/0156015 A1 * | 5/2019 | Brannock | G06F 9/468 |
| 2020/0257521 A1 | 8/2020 | Jayakumar et al. | |
| 2021/0141903 A1 | 5/2021 | Jayakumar et al. | |

OTHER PUBLICATIONS

Matsumoto Toshio, JN H11154099, (translation), Jun. 8, 1999, 12 pgs <JP_H11154099.pdf>.*

Intel; "Intel Hardware Shield Overview," Intel White Paper, Information Technology Security; 2021; 7 pages.

PCT International Search Report and Written Opinion issued in PCT/CN2021/106444, dated Mar. 23, 2022; 9 pages.

* cited by examiner

1100
RECEIVE, BY SRM, SMI INDICATING SMM SHIM IS TO BE UPDATED
1110
VERIFY, BY SRM, A SIGNATURE OF SMM SHIM UPDATE IMAGE
1120
UPDATE SMM SHIM
1130
FIG. 11

1200

RECEIVE, BY SRM, SMI INDICATING SMI HANDLER IS TO BE UPDATED
1210

IMPLEMENT, BY SRM, SRM RESOURCE PROTECTION POLICY
1220

UPDATE, BY SMM SHIM, SMI HANDLER
1230

FIG. 12

SYSTEM MANAGEMENT MODE RUNTIME RESILIENCY MANAGER

CROSS-REFERENCE TO RELATED APPLICATION(S)

This application is a continuation of International Application No. PCT/CN2021/106444, filed Jul. 15, 2021, entitled "SYSTEM MANAGEMENT MODE RUNTIME RESILIENCY MANAGER," the entirety of which application is incorporated herein by reference in its entirety.

BACKGROUND

System Management Mode (SMM) is an operating mode of x86 central processor units (CPUs) in which normal execution, including the operating system or virtual machine monitor (VMM), is suspended. An alternate software system, which may reside in a computing system's firmware, is then executed with high privileges. In general, SMM is intended for use only by system firmware, not by application software. The SMM may be entered through a system management interrupt (SMI). In at least some implementations, the SMM code is executed in a separate address space inaccessible to other operating modes of a CPU. Runtime SMM code may operate at the highest privilege to access system resources, such as physical memory, memory-mapped input/output (MMIO), input/output (I/O), model-specific registers (MSRs), and save state registers.

BRIEF DESCRIPTION OF THE DRAWINGS

FIG. 11 is a flowchart of a second example method of updating an SMM policy shim by an SRM.

FIG. 12 is a flowchart of a second example method of protecting a computing system while updating an SMI handler.

DETAILED DESCRIPTION

Figure 1:
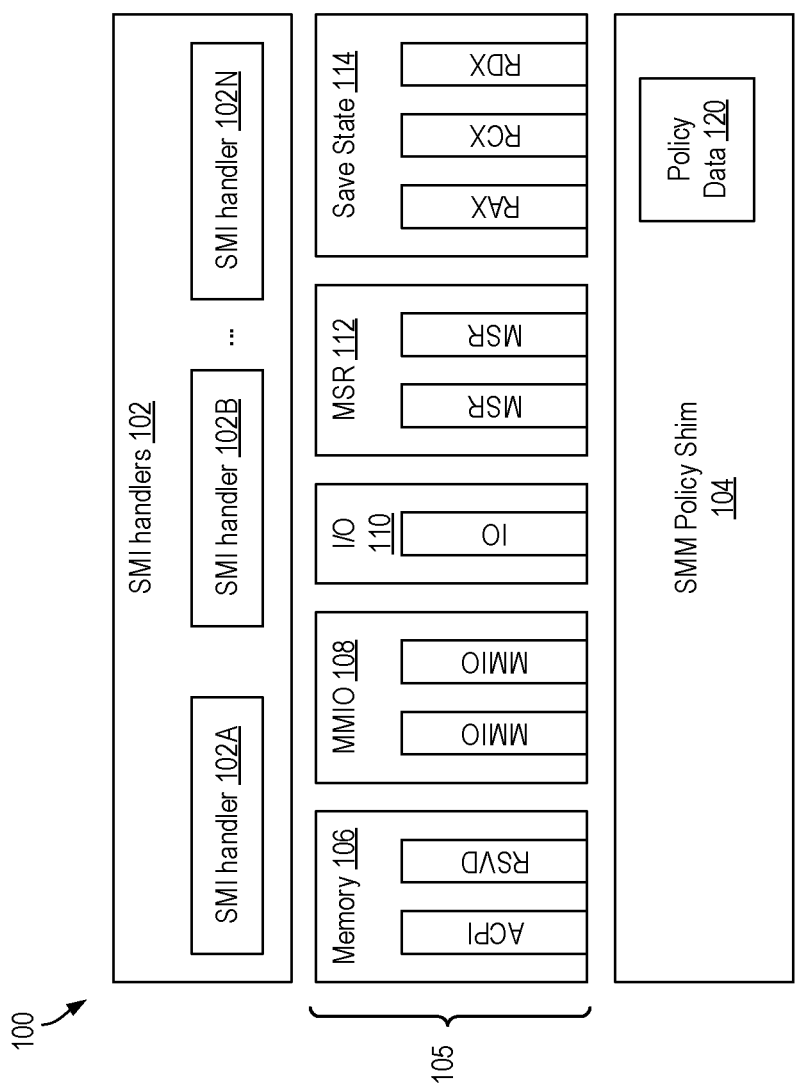
FIG. 1 illustrates an example system to provide SMM protection utilizing an SMM policy shim.

In the following description, specific details are set forth, but embodiments of the technologies described herein may be practiced without these specific details. Well-known circuits, structures, and techniques have not been shown in detail to avoid obscuring an understanding of this description. "An embodiment," "various embodiments," "some embodiments," and the like may include features, structures, or characteristics, but not every embodiment necessarily includes the particular features, structures, or characteristics.

Some embodiments may have some, all, or none of the features described for other embodiments. "First," "second," "third," and the like describe a common object and indicate different instances of like objects being referred to. Such adjectives do not imply objects so described must be in a given sequence, either temporally or spatially, in ranking, or any other manner "Connected" may indicate elements are in direct physical or electrical contact with each other and "coupled" may indicate elements co-operate or interact with each other, but they may or may not be in direct physical or electrical contact.

The description may use the phrases "in an embodiment," "in embodiments," "in some embodiments," and/or "in various embodiments," each of which may refer to one or more of the same or different embodiments. Furthermore, the terms "comprising," "including," "having," and the like, as used with respect to embodiments of the present disclosure, are synonymous.

As used herein, the terms "operating", "executing", or "running" as they pertain to software or firmware in relation to a system, device, platform, or resource are used interchangeably and can refer to software or firmware stored in one or more computer-readable storage media accessible by the system, device, platform or resource, even though the software or firmware instructions are not actively being executed by the system, device, platform, or resource. As used herein, the term "firmware" refers to computer-executable instructions stored on one or more non-transitory computer-readable media, such as flash memory (e.g., serial NOR flash), solid-state drives, random-access memories (e.g., SRAM, DRAM), or any other non-transitory computer-readable media described or referenced herein.

Reference is now made to the drawings, which are not necessarily drawn to scale, wherein similar or same numbers may be used to designate same or similar parts in different figures. The use of similar or same numbers in different figures does not mean all figures including similar or same numbers constitute a single or same embodiment. Like numerals having different letter suffixes may represent different instances of similar components. The drawings illustrate generally, by way of example, but not by way of limitation, various embodiments discussed in the present document.

In the following description, for purposes of explanation, numerous specific details are set forth in order to provide a thorough understanding thereof. It may be evident, however, that the novel embodiments can be practiced without these specific details. In other instances, well known structures and devices are shown in block diagram form in order to facilitate a description thereof. The intention is to cover all modifications, equivalents, and alternatives within the scope of the claims.

In one approach to protecting a computing system's system management mode (SMM) from malicious or buggy SMI handlers, SMM policy shim having a high privilege level (e.g., ring 0) monitors a computing system and deprivileges original equipment manufacturer (OEM) system management interrupt (SMI) handlers to a lower privilege level (e.g., ring 3).

FIG. 1 illustrates an example system to provide SMM protection utilizing an SMM policy shim. The system 100 comprises SMI handlers 102 (comprising any number of SMI handlers 102A-102N), an SMM policy shim (SMM shim) 104, and computing system resources 105, such as physical memory 106, memory-mapped input/output (MMIO) 108, input/output (I/O) 110, model-specific registers (MSRs) 112, and Save State registers 114. The SMM shim 104 operates at a higher privilege level than the SMI handlers. For example, the SMM shim 104 can operate at a ring 0 privilege level and the SMI handlers 102 can operate at a ring 3 privilege level. The SMI handlers 102 may be intended for operating at a higher privilege level but have been de-privileged lower privilege level of by the system 100. In various embodiments, the SMI handlers 102 run in system management RAM (SRAM) or an area of DRAM (e.g., on a dual-inline memory module (DIMM) along with the system memory) that is not visible to a processing unit unless an operating system (OS) or virtual machine monitor (VMM) is operating in SMM.

The system resources are partitioned into two categories: SMI accessible resources and SMI non-accessible resources. During a computing system's boot sequence, the SMI handlers 102 declare (via, for example, SMI handler policy data that can be part of a handler) the system resources they may access during system runtime and the SMM shim 104 records these resource access policies as SMM shim resource protection policy data 120. The SMM shim 104 enforces resource protection policies based on the SMM shim resource protection policy data during OS/VMM runtime.

The SMM shim 104 can utilize various approaches to implement these resource protection policies during runtime for the various computing system resources 105:

Physical memory 106: The SMM policy shim 104 can use a page table that is specific to the SMI handlers 102 (separate from a page table of the operating system) to expose the memory pages accessible to the SMI handlers 102 according to the resource protection policies. In some embodiments, the page table (and any other page table described herein) can be an extended page table of the type used in certain x86 processing units. Pages not to be accessed by the SMI handlers 102 are marked as not present in the page table. In other words, there is no mapping for these pages in the page table for the SMI handlers 102. In some embodiments, the page table for the SMI handlers 102 is stored in SMRAM. The page table may map logical memory addresses to addresses of the physical memory 106 (e.g., system memory coupled to the processor). In some embodiments, the physical memory 106 may comprise DRAM, any type of memory described or referenced herein, or other suitable memory type.

MMIO 108: In MMIO, memory of an I/O device may be mapped to a processing unit's address space. Thus, the processing unit and I/O device are mapped to each other using the common memory address space. The processing unit instructions and bus used to access the physical memory 106 may also be used to access memory of I/O devices (i.e., MMIO 108). The MMIO 108 may be protected using any of the techniques used to protect the physical memory 106. The SMM shim 104 may utilize the page table for the SMI handlers 102 to enforce resource protection policies (e.g., by not mapping MMIOs that should not be accessible to the SMI handler 102). In various embodiments, policy granularity as small as a bit or a byte may be implemented. For example, a portion (e.g., some registers of an I/O device) of a memory page mapped to MMIO may be accessible to the SMI handlers 102, while the rest of the page is not. In other embodiments, accessibility may be determined on a page-by-page basis. In various embodiments, when the page table mapping for a particular page is created, a page that should not be directly accessible to the SMI handlers 102 may be designated as a supervisor page so that code with a lower privilege level cannot directly access the page. Thus, resource protection policies may specify which portions of the MMIO 108 are accessible to the SMI handler 102 using any suitable granularity.

I/O 110: For I/O ports, the SMM policy shim 104 may maintain an I/O-bitmap that can permit or deny I/O instructions from an SMI handler 102. Instead of faulting every time an I/O port is accessed, if the bit for the I/O port bit is set in the I/O bitmap, access to the I/O port may be granted.

MSR 112: A processing unit may include a plurality of MSRs 112, which may be distinguished from general-purpose registers and floating-point registers of the processing unit. In a particular embodiment, a processing unit may implement two instructions for accessing these MSRs: a Read from Model Specific Register (RDMSR) instruction and a Write to Model Specific Register (WRMSR) instruction. MSRs may be organized into an array of registers to serve any suitable functions. For example, they may interact with a bus, change power states, or perform operations that are specific to a CPU model (or group of CPU models). MSRs allow a processing unit designer to add microarchitecture functionality without having to add an additional instruction to the CPU instruction set.

The SMM policy shim 104 may maintain a list of MSR protection policies and set up an exception handler. RDMSR and WRMSR may be supervisor or privileged instructions (e.g., these instructions may not be legal from ring 3). When an SMI handler 102 utilizes an RDMSR instruction and/or a Write to Model Specific Register WRMSR instruction to access an MSR, a general protection (GP) fault is triggered. The SMM policy shim exception handler then looks up the MSR protection policy list and determines whether this MSR access is granted or denied. If the access is granted, the SMM policy shim 104 executes the MSR access instruction and either returns data read from the MSR back to the SMI handler (in the case of RDMSR) or writes data to the MSR (in the case of WRMSR). If the access is denied, control returns to the SMI exception handler without executing the MSR access instruction. The protection policy may be Read, Write, Scrub, or Save/Restore. Scrub may represent a policy in which the SMI handler 102 may access an MSR, but the MSR must be scrubbed first (e.g., overwritten with blank data because the MSR may contain sensitive data, such as operating system context). Policies may be set on a per-MSR basis. Various embodiments may have bit-level granularity control (i.e., different policies may be set for different bits within the same MSR).

Save State register 114: When an SMI occurs, a processing unit may switch context (i.e., change execution state). The context of the OS/VMM is saved and may be restored once SMM is exited. Saving an OS/VMM context can comprise an SMM shim 104 storing data stored in general-purpose registers. In a memory-based save state approach, the context may be saved into DRAM or other memory external to a processing unit. In a register-based save state (e.g., MSR-based state save) approach, the context may be stored in memory inside of the processing unit (e.g., Save State registers 114), such as SMRAM or a special register bank and the saved area may be exposed to the SMI handler 102 via a bank of registers (e.g., MSRs). The registers that are saved may also be scrubbed to prevent the SMI handler 102 from accessing sensitive data. After an SMI handler 102 is finished handling an SMI, an RSM (return from SMM) instruction may be issued and the saved context may be restored (e.g., from the save state area into processing unit registers).

If a memory-based save state approach is used, the SMM policy shim 104 can save the SMM save state content at SMI entry (when control of the system 100 is handed over to the SMI handler 102). Then, at SMI exit (when control is passed back to the SMM policy shim 104), the SMM policy shim 104 can decide which region to restore based upon the save state protection policy. Access to the save state information may be prevented by resource protection policies (e.g., which registers are saved and/or scrubbed may be specified by the policy). For example, if SMI handler 102 only requests access to particular general-purpose registers (e.g., RAX, RCX, and RDX), the SMM shim 104 may then restore any other register, such as RBX, R8, or R9.

In some embodiments, if register-based save state is supported, the SMM policy shim 104 can grant or deny the MSR access based upon save state policy. Thus, the MSR protection policies discussed above may apply when register-based save state is used. Such an implementation may also provide bit-level granularity control in some embodiments.

The SMM policy shim 104 is established as a root of trust during a boot sequence of the computing system 100. Dynamic root of trust approaches are used to provide evidence that the SMM policy shim 104 is a trusted platform during runtime (which the computing system may rely upon when performing, for example, an update of the SMM policy shim 104 or one of the SMI handlers 102). One such approach is to perform a hash operation of SMM shim code and the SMM shim policy data 120 during runtime and store the resulting hash values in SMRAM. In some embodiments, this can be performed by a platform properties assessment module (PPAM). The PPAM can use an SMI transfer monitor launch capability to perform measurements (e.g., perform hash operations) of the SMM shim code and policy data. SMM shim code and policy data measurements can be performed as part of the SENTER instructions on some Intel® processing units.

Figure 2:
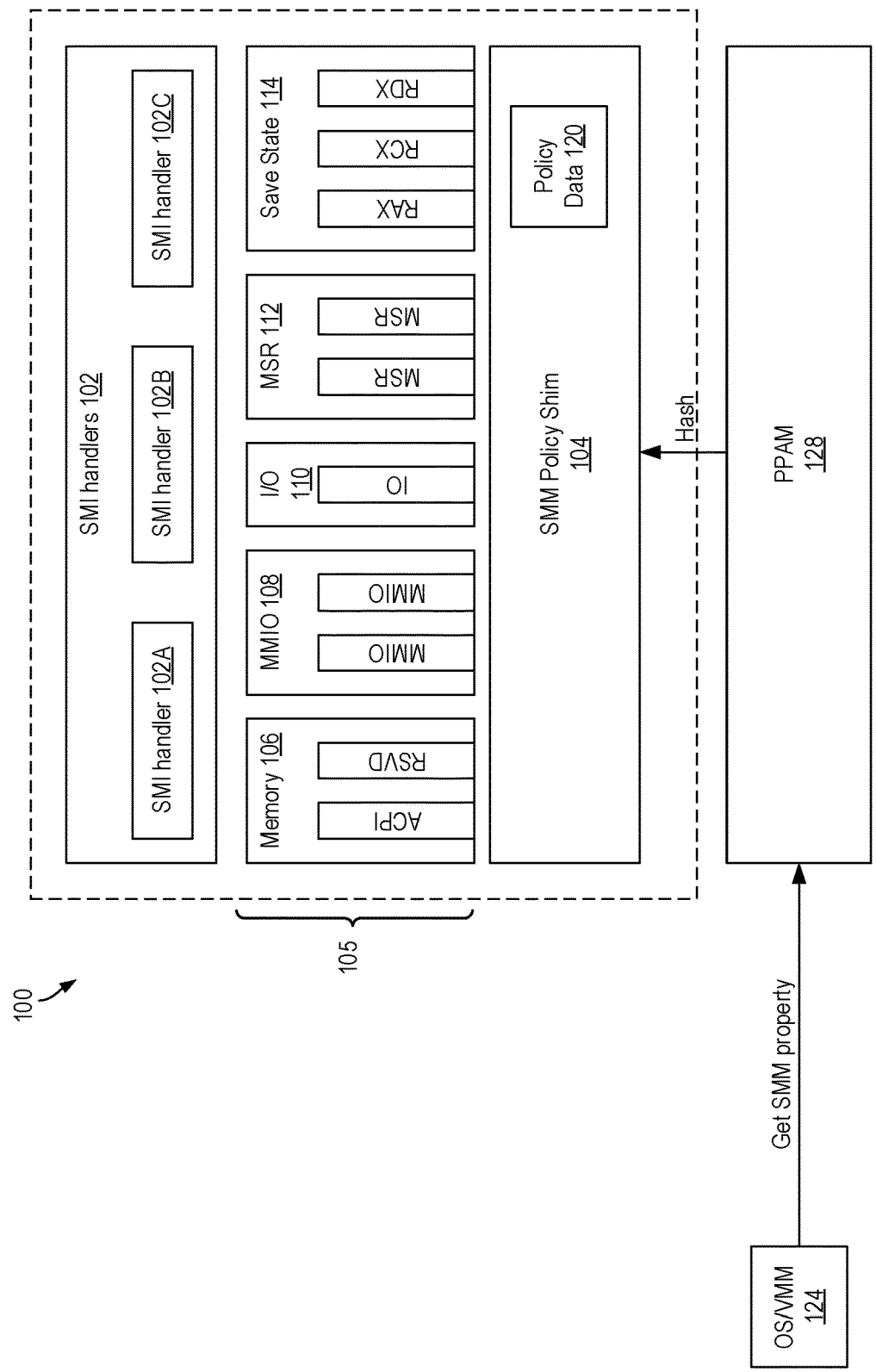
FIG. 2 illustrates a guest virtual machine monitor requesting SMM properties in the example computing system of FIG. 1.

FIG. 2 illustrates a guest virtual machine monitor requesting SMM properties in the example computing system of FIG. 1. Before taking an action based on SMM shim policy data 120, an OS/VMM 124 and/or a guest virtual machine (VM) can authenticate the SMM shim 104. Authentication can comprise, for example, the OS/VMM 124 requesting SMM shim code and/or SMM policy data hash values from a PPAM 128 and comparing those values against a database of known good hash values. Such a database can be provided by, for example, an integrated circuit component, OEM, or original design manufacturer (ODM) vendor. In some embodiments, the PPAM 128 can perform a hash operation on the SMM shim code and/or the policy data 120 as part of the authentication process. In some embodiments, the OS/VMM 124 can request hash results directly from the SMM shim 104.

Figure 3:
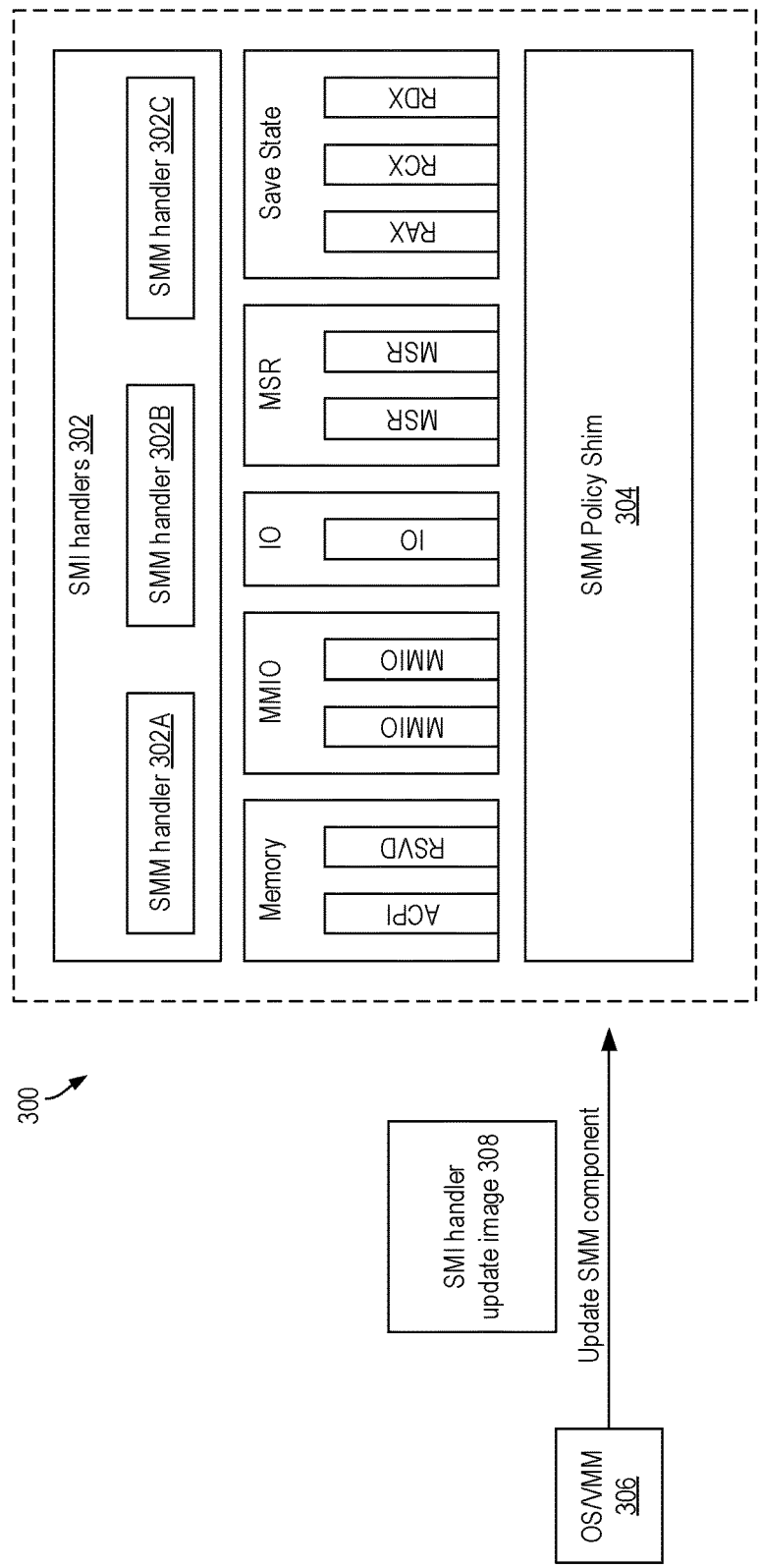
FIG. 3 illustrates a computing system in which an SMM policy shim is used to update one or more of the SMI handlers.

In computing systems where seamless updates of SMI handlers are supported (that is, SMI handlers can be updated without resetting the system), an SMM shim can be used as an SMM Root-of-Trust (RoT) for Update (RTU). FIG. 3 illustrates a computing system 300 in which an SMM policy shim 304 is used to update one or more SMI handlers 302. As part of updating an SMI handler, an OS/VMM 306 can trigger an SMI indicating that an SMI handler 302 is to be updated. That is, that an existing SMI handler 302 is to be replaced by an updated SMI handler 308.

In computing systems that employ an SMM policy shim for protecting computing system resources and where SMM components (e.g., SMI handlers, SMM policy shim) are updatable, the SMM RoT may temporarily remove system resource protection policies while the SMM component is being updated. Such systems may be vulnerable to attack while an SMM component is being updated. An attack could take advantage of this vulnerability by, for example, changing the system state by writing to one or more of the system resources (e.g., memory, MMIO, I/O, MSR, Save State registers).

The SMM runtime resiliency manager (SRM) disclosed herein provides the following capabilities: protecting an SMM policy shim, updating an SMM policy shim, protecting a computing system while an SMM shim is updating an SMI handler, detecting an attacked or faulty SMM component, and replacing an attacked or faulty SMM component with a known good version of the SMM component. Thus, the SRM can provide a fuller resiliency solution than those only able to provide SMM component protection, SMM component measurements, and SMM component measurement reporting. The SRM can operate "underneath" (at a higher privilege level than) the SMM policy shim. For example, the SRM can operate at a ring −1 privilege level and the SMM policy shim can operate at a ring 0 privilege level. In some embodiments, the Intel® SMM Transfer Monitor (STM) runtime capability can be used to create an SRM.

Figure 4:
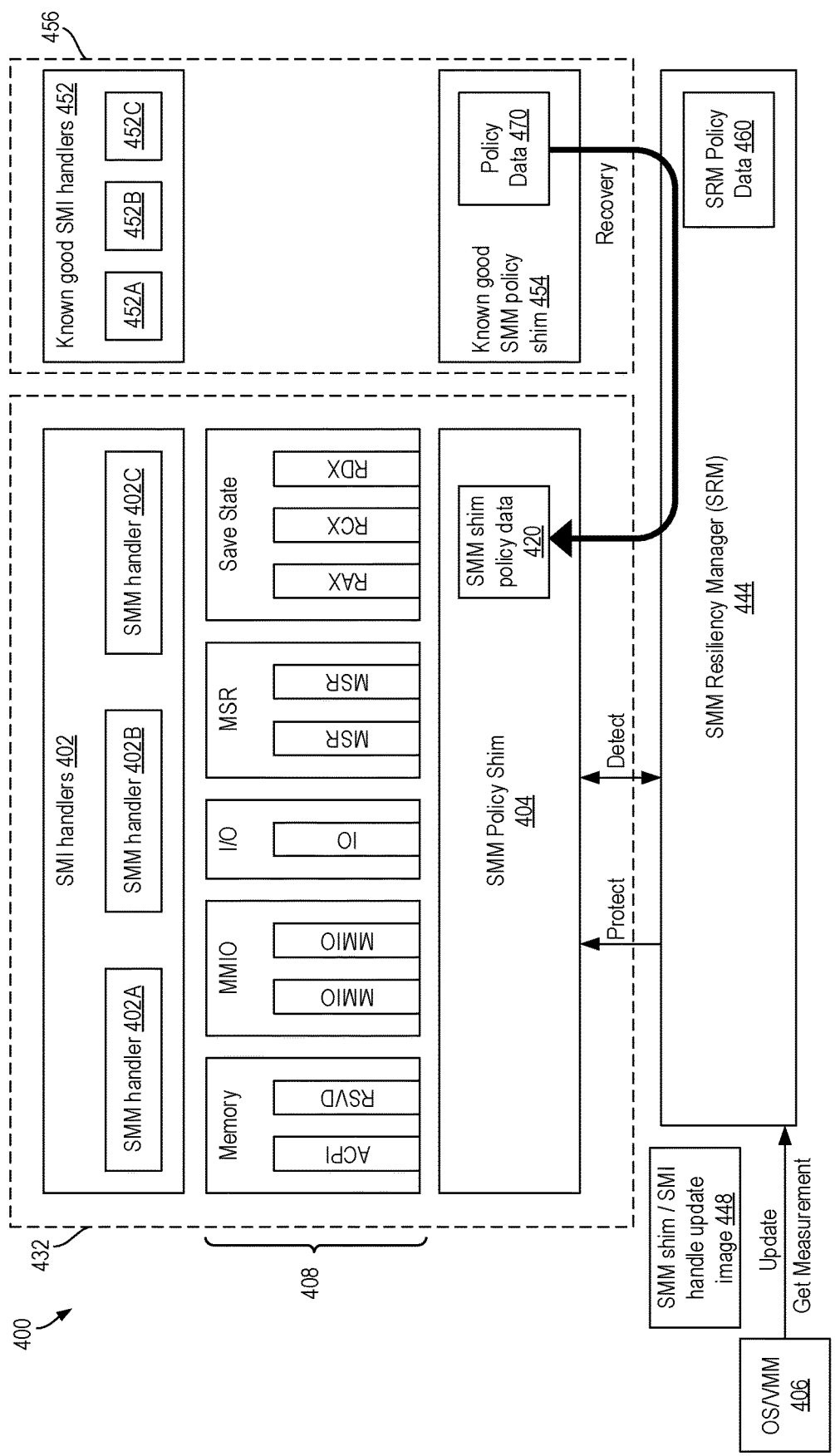
FIG. 4 illustrates a computing system comprising an example SMM runtime resiliency manager.

FIG. 4 illustrates a computing system comprising an example SMM runtime resiliency manager. The system 400 comprises SMI handlers 402, an SMM shim 404 comprising SMM shim policy data 420, and system resources 408 residing in an active domain 432; known good SMI handlers 452 and a known good SMM policy shim 454 comprising SMM policy data 470 in a recovery domain 456; and an SRM 444. The SRM 444 is capable of protecting and detecting attacks on the SMI handlers 402 and the SMM policy shim 404 in the active domain 432, of measuring SMM shim code and SMM shim policy data 420, of updating the SMM shim 404 and SMI handlers 402 with an updated SMM shim or SMI handler, and replacing a compromised SMI handler 402 or SMM policy shim 404 with a known good SMM component from the recovery domain 456 as part of an SMM recovery process.

Figure 5:
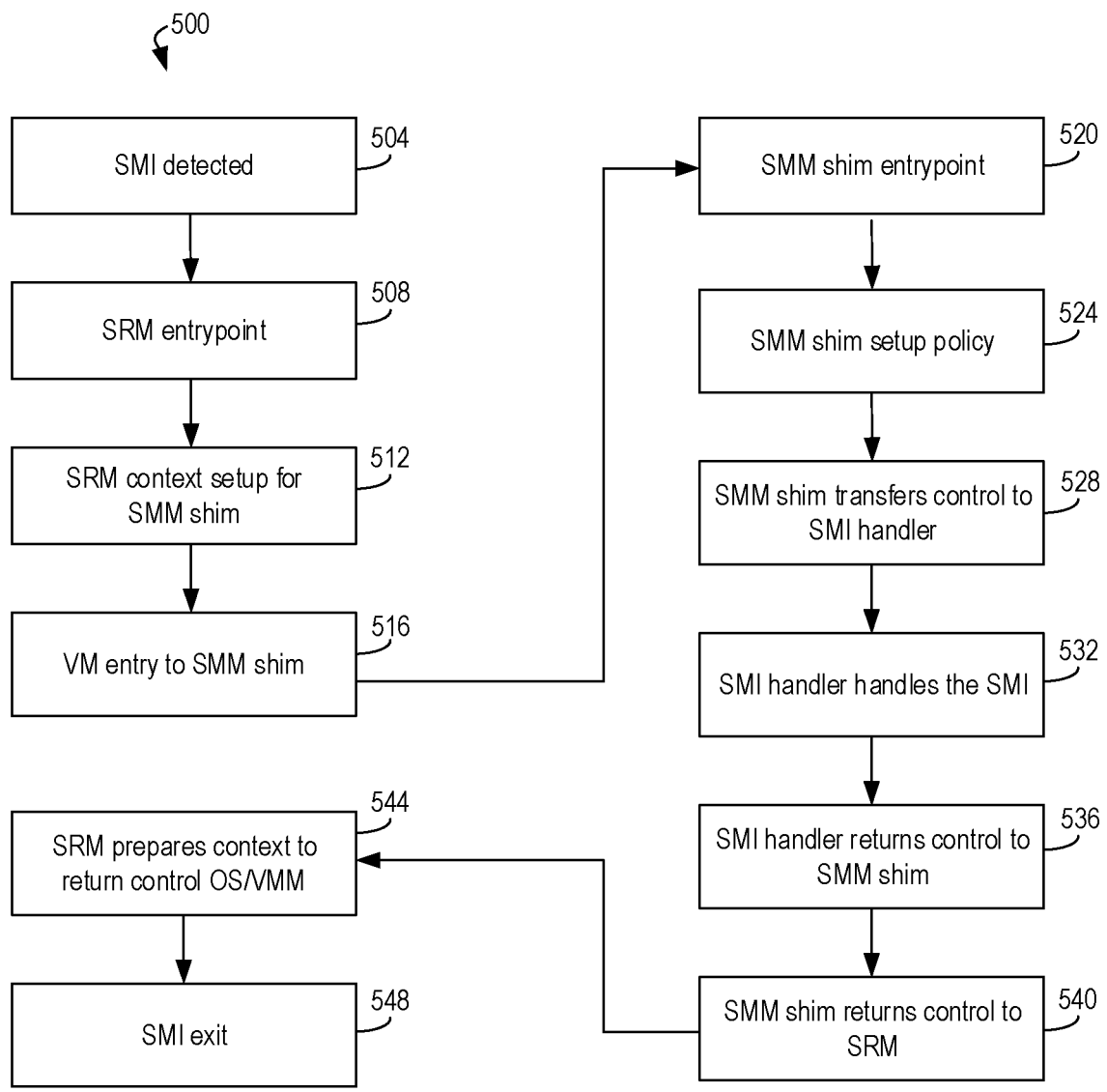
FIG. 5 is a flowchart of a first example method of protecting an SMM policy shim by an SRM.

FIG. 5 is a flowchart of a first example method of protecting an SMM policy shim by an SRM. The method 500 can be performed by a computing system with an SRM installed, such as system 400. Method 500 is discussed with reference to system 400.

At 504, an SMI triggered by an OS/VMM 406 operating on the system 400 is detected. At 508, the computing system 400 begins its handling of the SMI by executing SRM instructions that begin at an SRM entrypoint memory address. At 512, the SRM 444 sets up a computing system context for the SMM shim 404 before handing control of the computing system to the SMM shim 404. Setting up the computing system context can comprise the SRM 44 implementing an SMM shim protection policy to protect the SMM shim 404.

Implementing an SMM shim protection policy can comprise configuring a page table that specifies memory pages storing SMM shim code as having read-only access. In other embodiments, implementing an SMM shim protection policy can comprise configuring the page table to specify that memory pages storing SMM policy data 420 as having read-only access. In other embodiments, implementing an SMM shim protection policy can comprise configuring the page table to specify that memory pages storing SMM non-policy data as having read-write access. By configuring a page table to protect the code of the SMM policy shim code and the SMM shim policy data 420, an attempted write access to the SMM shim code or policy data will result be detected by a page fault error. As will be discussed below, page fault errors can be handled by the system 400 taking one or more recovery actions.

At 516, control of the system 400 is transferred from the SRM 444 to the SMM shim 404. At 520, the computing system begins its handling of the SMI by executing operations that begin at an SMM shim entrypoint memory address. At 524, the SMM shim 404 sets up the policy for the appropriate SMI handler 402 to handle the SMI. The SMM shim 404 can set up a system resource protection policy for the SMI handler 402 based on the SMM shim policy data 420 and configuring the appropriate data structures (e.g., page tables, bit maps) to allow access to system resources 408 by the SMI handler 402. At 528, the SMM shim 404 transfers control of the system 400 to the SMI handler 402. In some embodiments, this may include depriviliging the SMM execution mode before transferring control to the SMI handler 402. At 532, the SMI handler 402 handles the SMI and at 536, control is returned to the SMM shim 404. At 540, the SMM shim 404 returns control back to the SRM 444. At 544, the SRM 444 prepares the context of the computing system 400 for returning control to the OS/VMM 406 and at 548, exits the SMI handling process by returning control to the OS/VMM 406.

Figure 6:
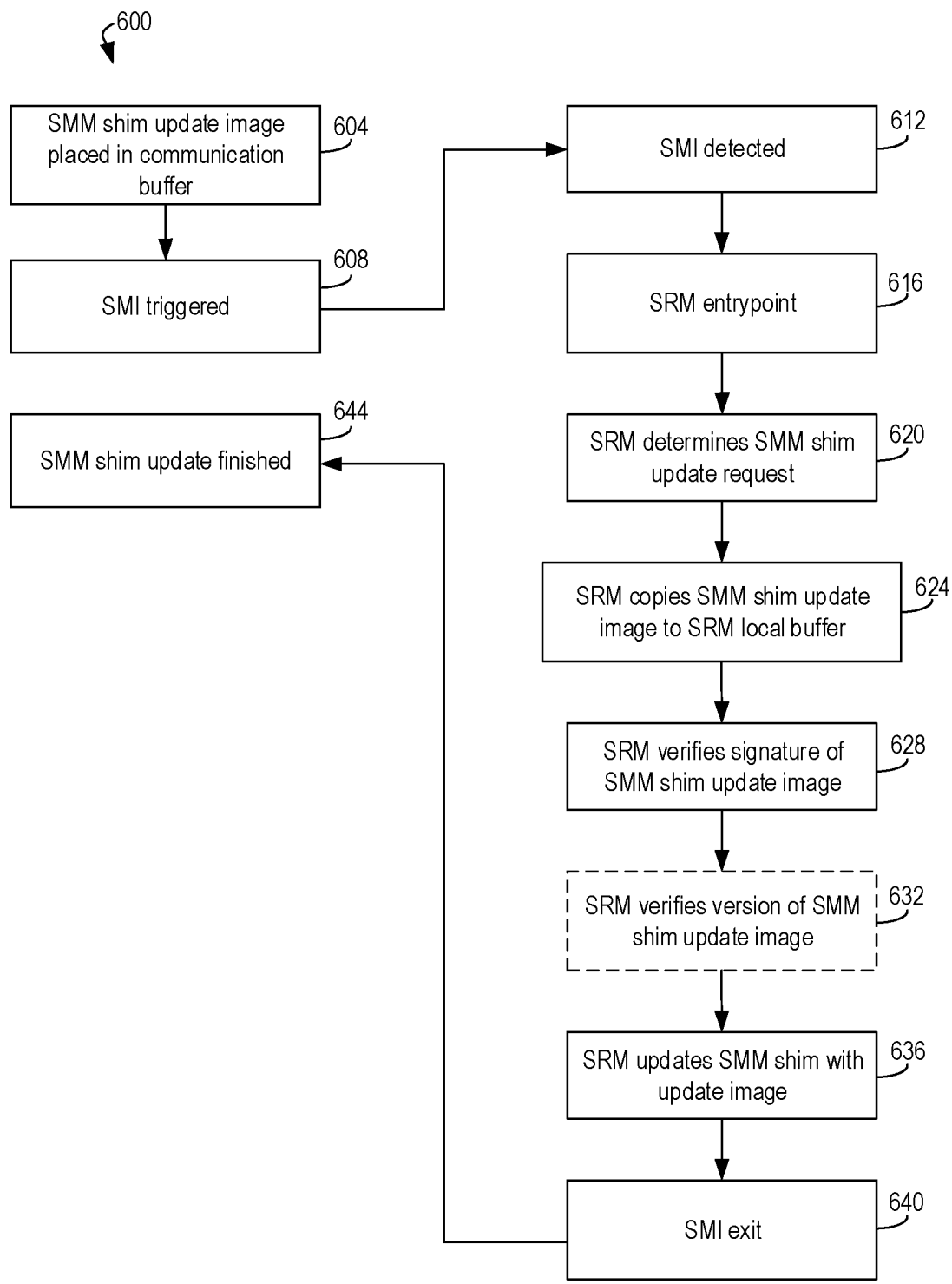
FIG. 6 is a flowchart of a first example method of updating an SMM policy shim by an SRM.

FIG. 6 is a flowchart of a first example method of updating an SMM policy shim by an SRM. Updating an SMM policy shim is advantageous for use in environments where the frequency of system resets are to be limited due to the business impacts of system resets or for a provider (e.g., cloud service provider) to satisfy system availability terms agreed to in service level agreements (SLAs). Method 600 is discussed with reference to system 400. In the method 600, at 604 an OS/VMM 406 places an SMM shim update image 448 in an SMM communication buffer used for passing information between the OS/VMM 406 and SMM components (e.g., SRM 444). The SMM shim update image 448 can be provided by a computing system vendor or other entity in response to, for example, the vendor determining that there is a vulnerability in the SMM shim code or policy data (e.g., policy data unnecessarily or erroneously exposing system resources to an SMI handler, bugs in the SMM shim code). The SMM shim update image 448 comprises updated SMM shim code and in some embodiments can further comprise updated SMM shim policy data. At 608, the OS/VMM 406 triggers an SMI indicating that the SMM shim 404 is to be updated. At 612, the SMI is detected and at 616, the computing system 400 begins execution of the SRM 444 by executing SRM instructions that begin at the SRM entrypoint memory address. At 620, the SRM 444 determines that the SMI indicates that the SMM shim 404 is to be updated and at 624, the SMM shim 404 copies the SMM shim update image from the communication buffer to an SRM local buffer.

At 628, the SRM 444 verifies a signature of the SMM shim update image 448. The SRM can optionally verify a version of the SMM shim update image at 632. At 636, after the SMM shim update image 448 is verified, the SRM updates the SMM shim with the updated SMM shim code in the SMM shim update image 448. In embodiments where the SMM shim update image 448 also contains updated SMM policy data, updating the SMM shim 404 can comprise updating the SMM shim policy data 420. The SRM 444 can verify the signature of the SMM shim update image 448 by, for example, decrypting the signature with a public key that is a counterpart to the private key used to generate the signature. After the SMM shim 404 is updated, the SMI handling process is exited at 640, and at 644, the SMM shim update process is complete.

Figure 7:
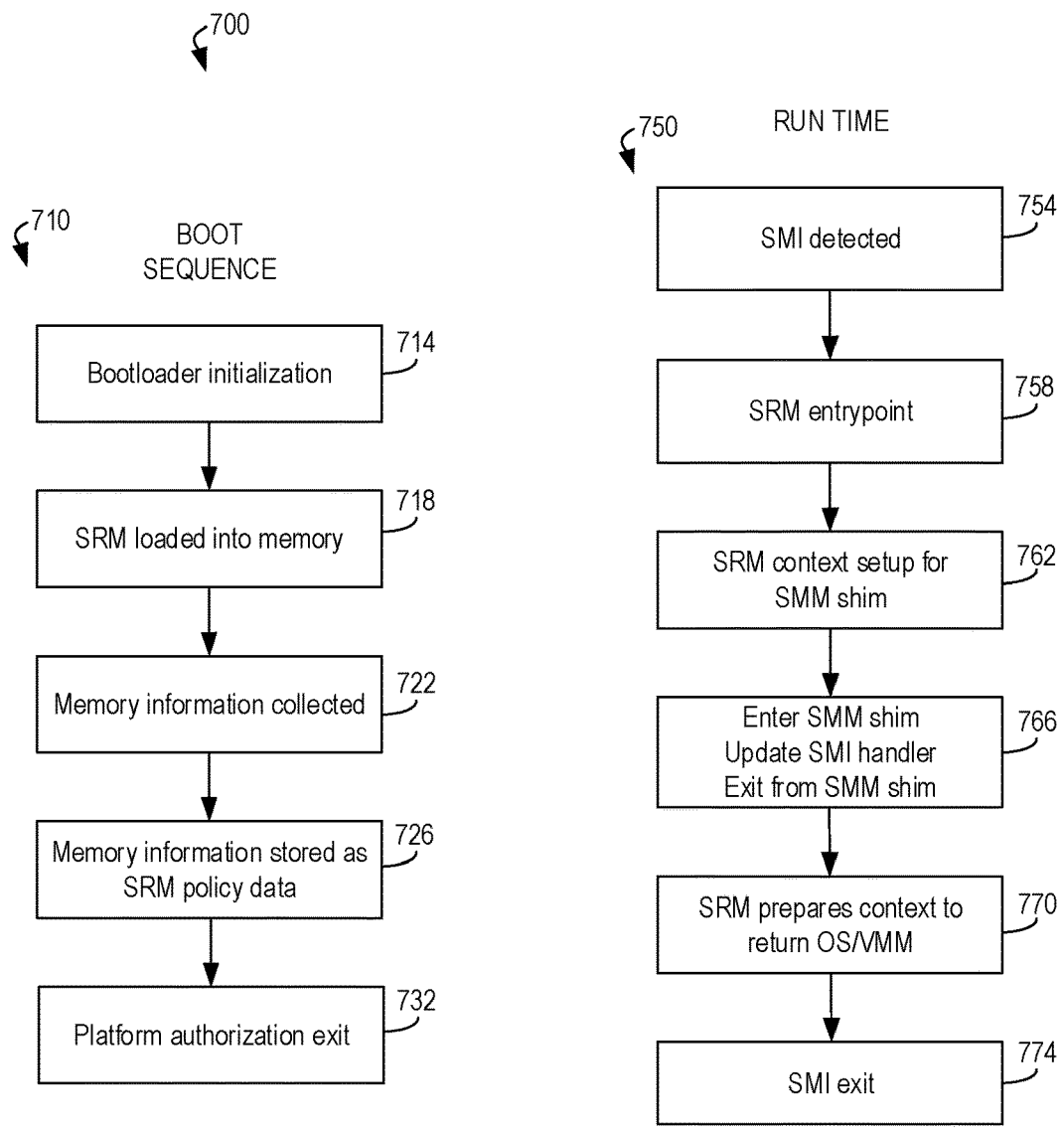
FIG. 7 is a flowchart of a first example method of protecting a computing system while updating an SMI handler.

FIG. 7 is a flowchart of a first example method of protecting a computing system while updating an SMI handler. Method 700 is discussed with reference to system 400. The method 700 comprises two portions: a boot sequence method portion 710 that is performed as part of a system boot sequence and a runtime method portion 750 that is performed during system runtime. At 714 of the boot sequence method portion 710, bootloader firmware (e.g., Basic Input/Output System (BIOS), Unified Extensible Firmware Interface (UEFI), coreboot, Intel® Slim Bootloader) is initialized. At 718, the bootloader firmware (bootloader) loads the SRM 444 into system memory (e.g., SMRAM). At 722, the bootloader collects memory information about the system and at 726, stores the collected system memory information in the SRM 444 as part of the SRM policy data 460. The system memory information collected by the bootloader and stored as part of the SRM policy data 460 can comprise, for example, information indicating where OS/VMM code and the SMM communication buffer are stored in system memory. At 732, the bootloader exits platform authentication.

During runtime, at 754 of the runtime method portion 750, an SMI indicating that an SMI handler is to updated is detected. At 758, the system 400 begins its handling of the SMI by handing system control over to the SRM 444 by executing operations that begin at the SRM entrypoint. At 762, the SRM 444 sets up the context of the computing system 400 before handing control of the system 400 over to the SMM shim 404. The system context set up by the SRM 444 can comprise, for example, the SRM 444 configuring page table entries indicating memory pages storing OS/VMM code are not present, the SRM configuring page table entries indicating memory pages storing SMM shim code as having read-only access, configuring page table entries indicating memory pages associated with the SMM communication buffer as having read-write access and/or configuring MSR, I/O and other system resource bitmaps to control access to those computing resources (e.g., setting a bit set to 1 (or 0) in the bitmap to indicate access to the resource is allowed and setting a bit to 0 (or 1) in the bitmap to indicate access to the resource is not allowed. In some embodiments, these bitmaps can be part of a virtual machine control structure (VMCS).

At 766, the SRM 444 transfers control to the SMM shim 404, the SMM shim 404 updates the appropriate SMI handler 402, and control of the system is transferred back to the SRM 444. As part of updating the SMI handler, the SMM shim 404 can deimplement an SMM shim resource protection policy that the SMM shim 404 previously implemented to protect system resource 408 (e.g., configuring page tables and bitmaps) before the SMI handler 402 is updated. The SMM shim 404 can update the SMI handler 402 based on an SMI handler update image 448. The SMI handler update image 448 can comprise updated SMI handler code and updated SMI handler policy information. After the SMI handler 402 is updated, the SMM shim 404 reimplement an SMM shim resource protection policy based on the updated SMI handler policy information. The SMM shim policy data 420 can be updated based on the updated SMI handler policy information. Even though system resource protection policies implemented by the SMM shim are disabled while an SMI handler is being updated, the system 400 is still protected by an SRM resource protection policy implemented by the SRM as part of the system context setup performed by the SRM 444 before the SRM hands control of the system over to the SMM shim 404. In some embodiments, the system context setup performed by the SRM 444 before handing over control of the system to the SMM shim 404 can implement an SRM resource protection policy that is the same as an implemented SMM resource protection policy. At 770, the SRM 444 prepares the system context to return control to the OS/VMM 406 and at 774, the SMI process is exited and control is returned to the OS/VMM 406.

Figure 8:
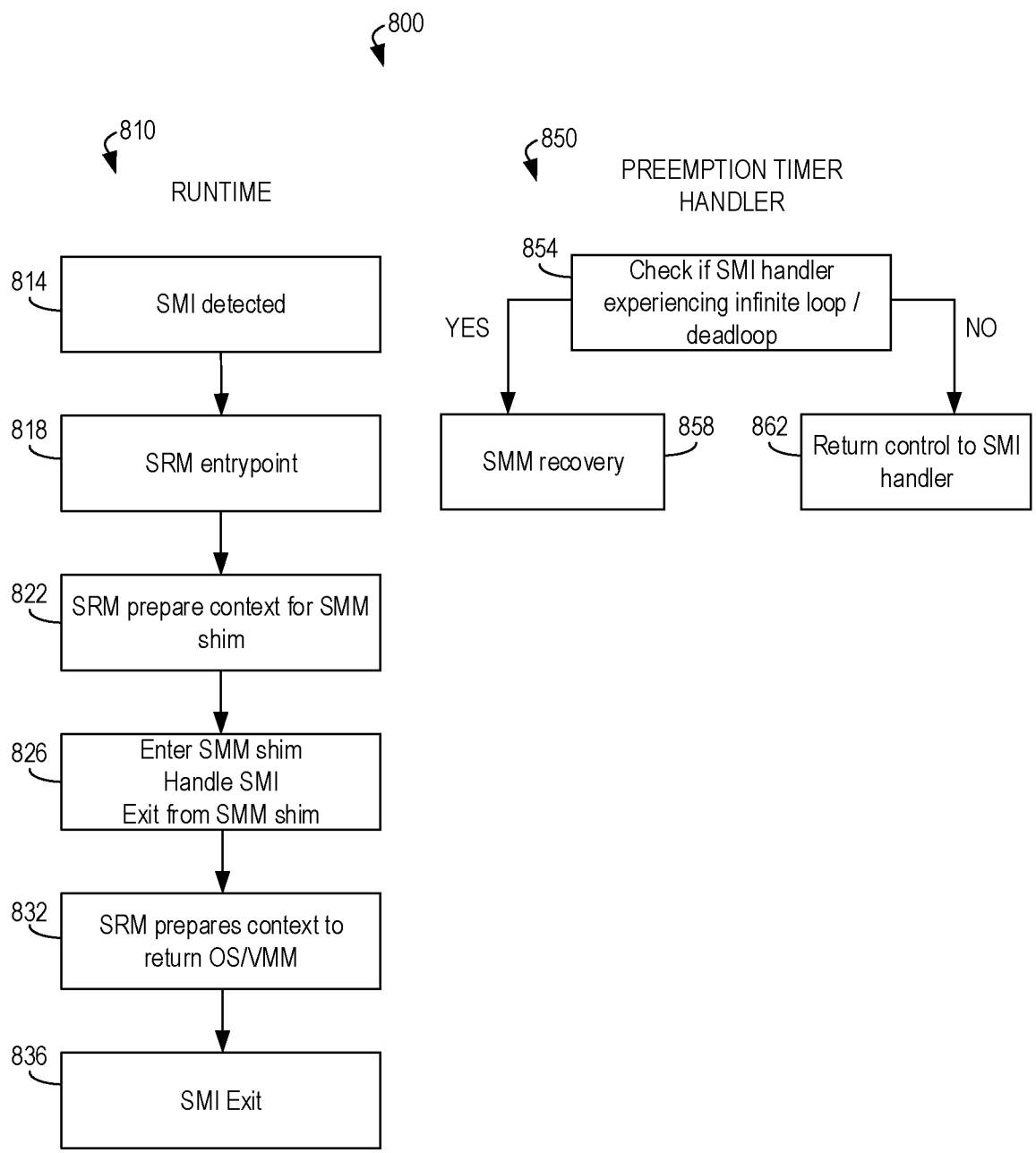
FIG. 8 is a flowchart of a first example method of detecting an attack on a computing system by an SRM.

FIG. 8 is a flowchart of a first example method of detecting an attack on a computing system by an SRM. The method 800 is discussed with reference to system 400. The method 800 comprises two portions: a runtime method portion 810 that is performed during system runtime and a preemption timer handler method portion 850. At 814 of the runtime method portion 810, an SMI indicating that an SMI handler is to updated is detected. At 818, the system 400 begins its handling of the SMI by handing control of the system 400 over to the SRM 444 by executing SRM operations that begin at the SRM entrypoint. At 822, the SRM 444 sets up a context of the computing system 400 before handing control of the system 400 over to the SMM shim 404.

The system context set up by the SRM 444 can comprise starting a preemption timer that triggers a preemption timer handler upon expiration of the timer. The preemption timer can be used to protect the system 400 from becoming unresponsive due to the SMI handler 402 being caught in an infinite loop or a deadloop, which could be the result of SMI handler code having been maliciously altered or faulty programming In embodiments where the SMM shim operates at the same privilege level as an OS/VMM, the preemption timer is set up by the SRM 444 instead of the SMM shim 404 to avoid conflicts with OS/VMM interrupt usage. In some embodiments, the preemption timer can be a virtual machine extension (VMX) preemption timer. The VMX can be part of a VMCS. At 826, the SRM 444 transfers control to the SMM shim 404, the SMM shim 404 transfers control to the SMI handler 402 to handle the SMI, and control of the system is transferred back to the SRM 444 once handling of the interrupt by the SMI handler is complete. At 832, the SRM prepares the system context to return control to the OS/VMM 406 and at 836 the SMI process is exited and control is returned to the OS/VMM 406.

The preemption timer handler method portion 850 can be performed by a preemption timer handler that is part of the SRM 444. The preemption timer handler can be invoked if the preemption timer set by the SRM 444 expires before the SMI handler has finished handling the SMI. At 854, the preemption timer handler checks to see if the SMI handler 402 was experiencing an infinite loop or deadloop (e.g., an instruction that does not update the instruction pointer) prior to expiration of the preemption timer. If so, recovery of the SMM is performed at 858. The recovery process can comprise terminating an SMI handler. The recovery process can further comprise restoring known good SMM components, as will be discussed in greater detail below. If the SMI handler 402 is not determined to be experiencing an infinite loop or a deadloop, at 862, control is returned to the SMI handler 402 and the SMI handler is allowed to continue handling the SMI.

In some embodiments, SMM recovery is performed upon expiration of the preemption timer without determining whether the SMI handler is experiencing an infinite loop or deadloop. The preemption timer handler can determine whether the SMI handler 402 is experiencing an infinite loop or deadloop by analyzing instruction execution information indicating the instructions performed by the SMI handler 402 for a period before the timer expired, and determining that a single instruction or a set of instructions has been repeatedly executing more than a threshold number of times. In some embodiments, the instruction execution information can comprise RIP (instruction pointer register) information. In some embodiments, the SRM 444 can configure the system to store instruction execution information as part of setting up the system context before handing control over to the SMM shim In some embodiments, the SRM 444 can cache the instruction execution information in a cache local to the SRM 444 and perform its analysis on the cached instruction execution information.

In some embodiments, the preemption timer checks to see if the length of time that the SMI handler ran upon expiration of the preemption timer exceeds a threshold value indicated in the SRM policy data. If the threshold value is exceeded, the SRM can start an SMM recovery process. If not, then SRM returns control to the SMI handler 402. Alternatively, if the threshold value has not been exceeded, the preemption timer handler can execute the preemption timer handler method portion 850 to see if the SMI handler is caught in an infinite loop or deadloop. In some embodiments, the method 810 can comprise the SRM 444 setting the preemption timer to a preemption timer duration based on the SRM policy data 460.

Figure 9:
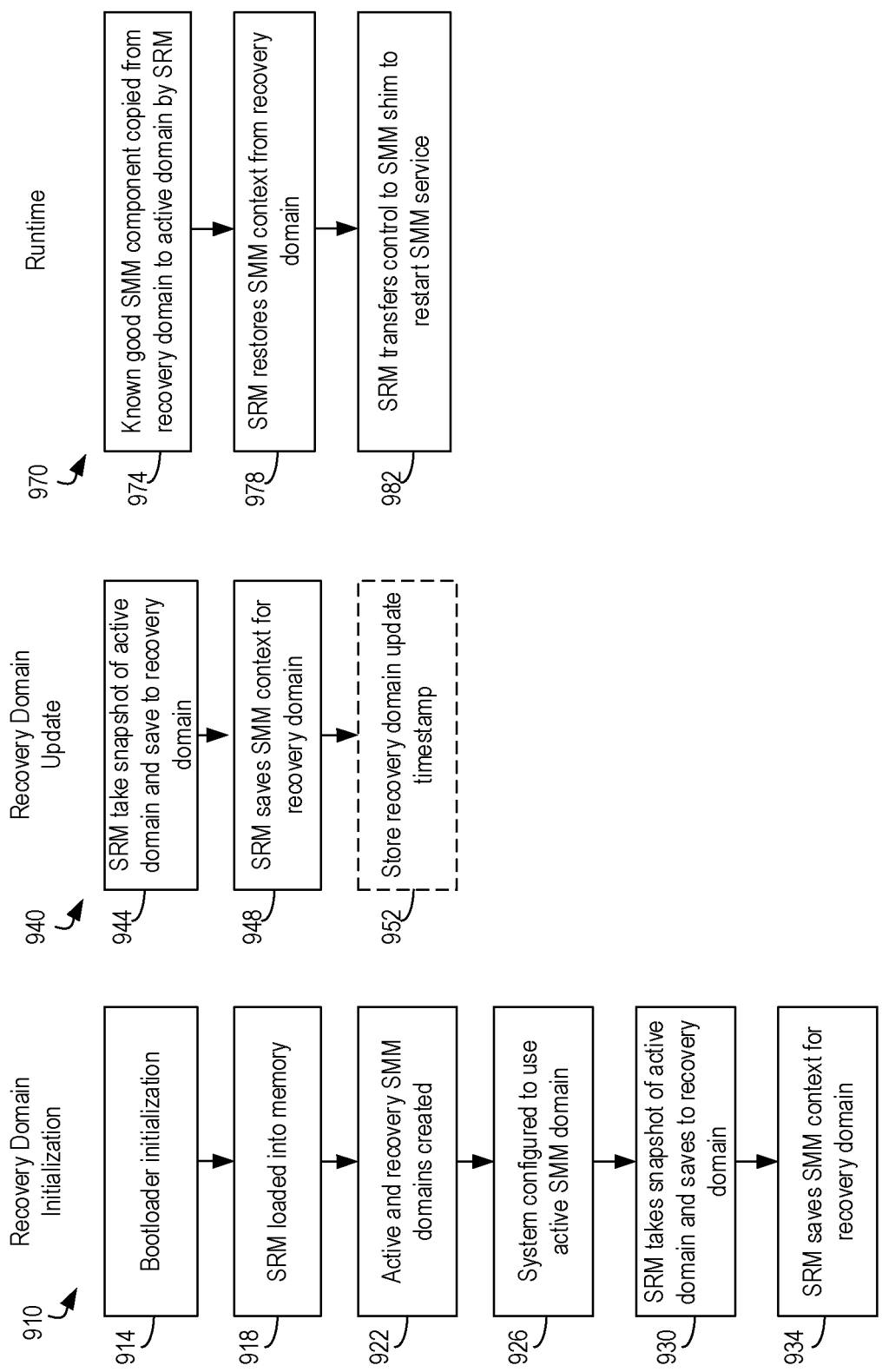
FIG. 9 illustrates example methods for recovering SMM components.

FIG. 9 illustrates example methods for recovering SMM components. SMM component recovery can be performed in response to, for example, expiration of a preemption timer, expiration of a preemption timer and a determination that an SMI handler is caught in an infinite loop or deadloop, or expiration of a preemption timer and a determination that an SMI handler has been executing longer than a threshold amount of time. SMM component recovery can also be performed in response to a page fault exception caused by an SMI handler attempting to access a region of memory indicated by a page table as not accessible to the SMI handler or an SMI handler attempting to access other system resources in violation of a resource protection policy realized through configuration of bitmaps (e.g., MSR, I/O bitmaps) that control system resource access. Recovery of SMM components can be performed by an exception handler that is invoked after a page fault exception, a preemption timer handler that is invoked after expiration of a preemption timer, or another entity.

In general, an SRM can recover SMM components by replacing SMM components in an active domain with known good versions of the SMM components from a recovery domain. The methods illustrated in FIG. 9 are discussed with reference to the system 400. Method 910 is an example method of initializing a recovery domain. At 914, bootloader firmware is initialized. At 918, the bootloader loads the SRM 444 into system memory. At 922, the bootloader creates an active domain 432 and a recovery domain 456. At 926, the bootloader configures the system to use the active domain 432. At 930, the bootloader invokes the SRM 444 to take a snapshot of the active domain 432 and save the snapshot to the recovery domain 456. This can comprise the SRM 444 making a copy of the SMM policy shim 404 (including the SMM policy data 420) and SMI handlers 402, and storing these copies in the recovery domain as a known good SMM policy shim 454 (comprising SMM policy data 470) and known good SMI handlers 452. In some embodiments, the active domain snapshot taken in 926 can be taken after the system exits a platform authentication phase of a system start-up sequence. At 934, the SRM saves an SMM context for the recovery domain, which can include information such as the memory location where the recovery domain is stored (e.g., the recovery domain's SMBASE value, the recovery domain's entrypoint at base memory address from which the recovery domain's entrypoint can be determined).

Method 940 is an example method of updating an SMM recovery domain during system runtime. In some embodiments, the SRM 444 can update the recovery domain 456 during system runtime. Recovery domain updates can be performed, for example, periodically, in response to certain events, a combination thereof, or based on other policies. An event-based recovery domain update can be performed, for example, just prior to an SMM component (e.g., SMI handler, SMM shim) being updated or in response to the first successful SMM shim invocation after an SMM shim runtime update. In some embodiments, the recovery domain update policy can be specified by SRM policy data 460. At 944, the SRM 444 takes a snapshot of the active domain 432 during and saves the snapshot to the recovery domain. At 948, the SRM saves an SMM context for the recovery domain, which can include information such as the memory location where the recovery domain is stored (e.g., the recovery domain's SMBASE value). The method 940 can optionally include, at 952, the SRM storing a timestamp associated with the recovery domain update.

Method 970 is an example method of restoring SMM components from a recovery domain to an active domain. At 974 in the method 974, the SRM 444 copies one or more known good SMM components (e.g., known good SMI handlers 452, known good SMM policy shim 454 (with SMM policy data 470)) from the recovery domain 456 to the active domain 432. In some embodiments, all SMM components in the recovery domain 456 are copied over to the active domain 432 as part of an SMM recovery process. In other embodiments, fewer than all of the SMM components in the recovery domain are copied over. For example, the SRM 444 can copy a known good version of just the SMI handler that caused a page fault or that was handling an SMI when a preemption timer expired. At 978, the SRM 444 restores an SMM context from the recovery domain 456. At 982, the SRM 444 transfers control over to the SMM shim 404, thereby restarting the SMM shim 404.

Figure 10:
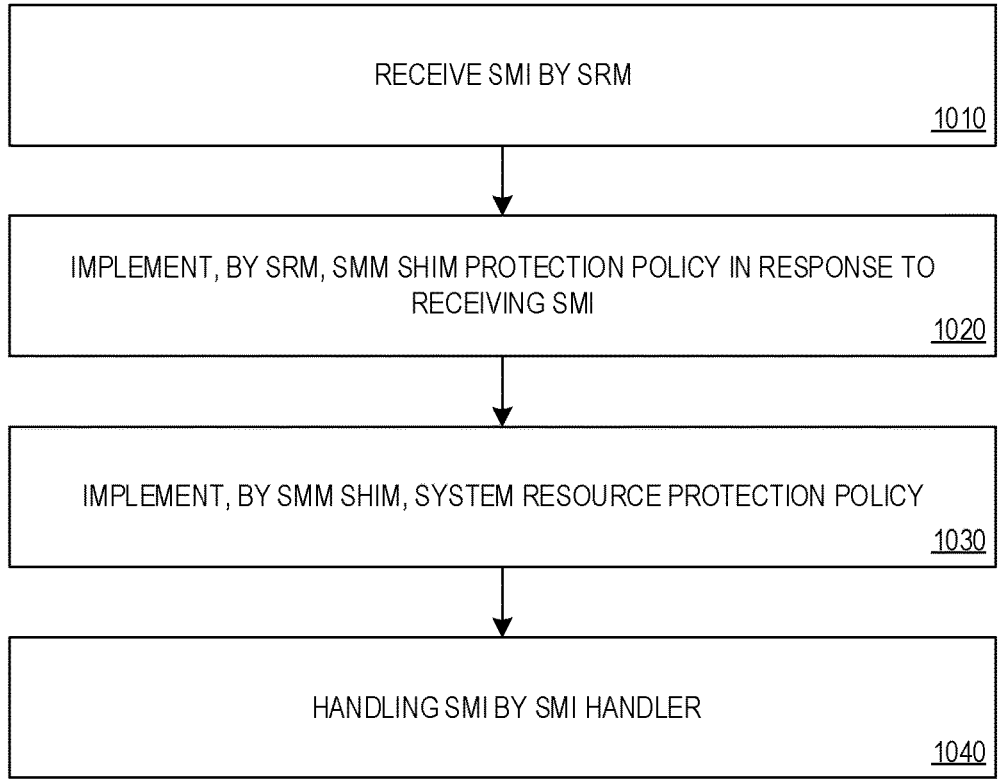
FIG. 10 is a flowchart of a second example method of protecting an SMM policy shim by an SRM.

FIG. 10 is a flowchart of a second example method of protecting an SMM policy shim by an SRM. At 1010 in the method 1000, a system management mode (SMM) resiliency manager (SRM) receives a system management interrupt (SMI). At 1020, the SRM implements an SMM shim protection policy to protect an SMM shim in response to receiving the SMI. At 1030, the SMM shim implements a system resource protection policy to protect one or more resources of a computing system during handling of the SMI by an SMI handler operating. At 1040, the SMI handler handles the SMI. The SRM, SMM shim, and the SMI handler operate on the computing system.

FIG. 11 is a flowchart of a second example method of updating an SMM policy shim by an SRM. At 1110 in method 1100, a system management mode (SMM) resiliency manager (SRM) operating on a computing system receives a system management interrupt (SMI) indicating an SMM shim is to be updated, the receiving the SMI comprising receiving, by the SRM, an SMM shim update image. At 1120, a signature of the SMM shim update image is verified by the SRM. At 1130, the SMM shim is updated with the SMM shim update image. The SRM and the SMM shim operate on the computing system.

FIG. 12 is a flowchart of a second example method of protecting a computing system while updating an SMI handler. At 1210 of method 1200, a system management mode (SMM) resiliency manager (SRM) operating on a computing system receives a system management interrupt (SMI) indicating an SMI handler is to be updated, the receiving the SMI comprising receiving, by the SRM, an SMI handler update image. At 1220, the SRM implements an SRM resource protection policy based on SRM resource protection policy data. At 1230, an SMM shim updates an SMI handler based on the SMI handler update image. The SRM, the SMM shim, and the SMI handler operate on a computing system.

Figure 13:
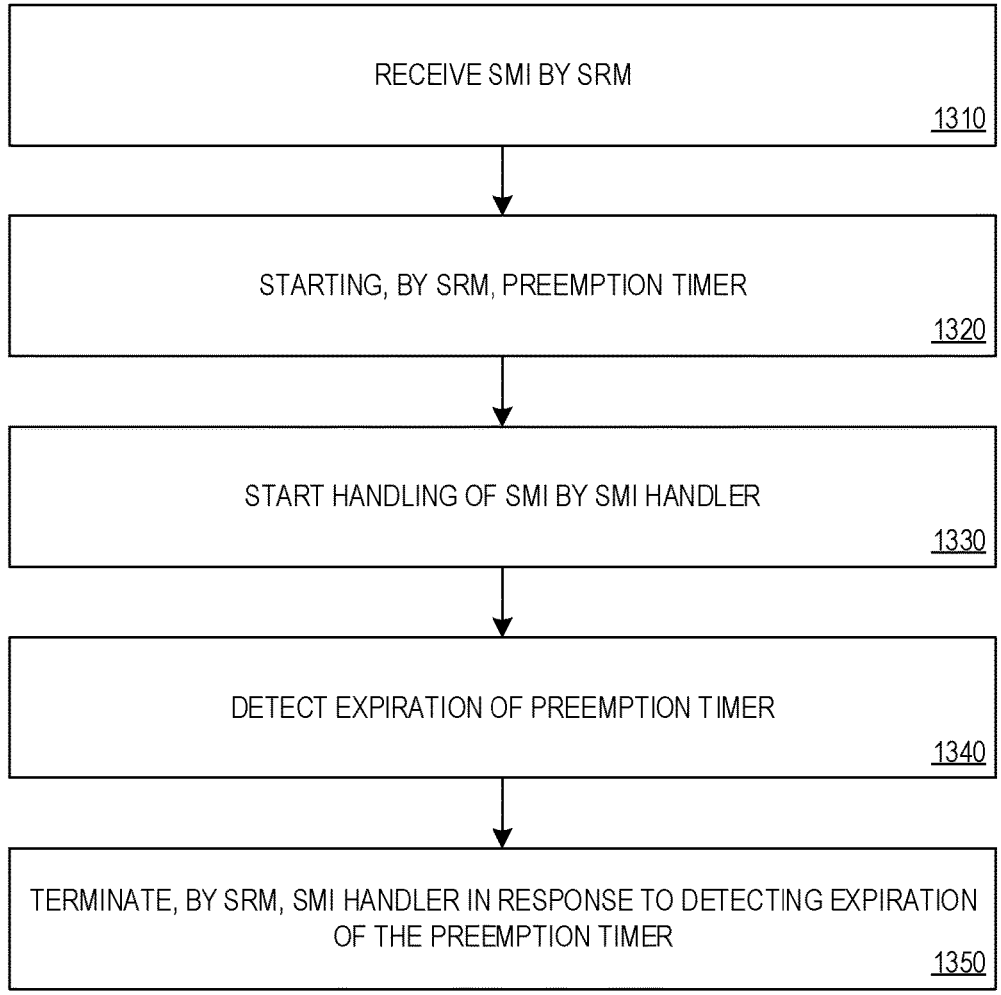
FIG. 13 is a flowchart of a second example method of detecting an attack on a computing system by an SRM.

FIG. 13 is a flowchart of a second example method of detecting an attack on a computing system by an SRM. At 1310 in the method 1300, a system management mode (SMM) resiliency manager (SRM) receives a system management interrupt (SMI). At 1320, the SRM starts a preemption timer in response to receiving the SMI. At 1330, an SMI handler starts handling of the SMI. At 1340, expiration of the preemption timer is detected. At 1350, the SRM terminates the SMI handler in response to detecting expiration of the preemption timer. The SRM, preemption timer, and the SMI handler operate on a computing system.

The SMM runtime resiliency manager (SRM) technologies disclosed herein can provide at least the following advantages. The SRM can protect and update the SMM shim, detect attacked SMM components, and recover SMM components from attacks. When the SMM shim tears down (deimplements) its system resource protection policies when updating an SMI handler, the SRM can set up a second level of protection to maintain the protection of system resources and the integrity of the system state.

The SMM components shown in FIGS. 1-4 can be implemented in software, hardware, firmware, or combinations thereof. A computer device referred to as being programmed to perform a method can be programmed to perform the method via software, hardware, firmware, or combinations thereof.

The technologies described herein can be performed by or implemented in any of a variety of computing systems, including mobile computing systems (e.g., smartphones, handheld computers, tablet computers, laptop computers, portable gaming consoles, 2-in-1 convertible computers, portable all-in-one computers), non-mobile computing systems (e.g., desktop computers, servers, workstations, stationary gaming consoles, set-top boxes, smart televisions, rack-level computing solutions (e.g., blade, tray, or sled computing systems)), and embedded computing systems (e.g., computing systems that are part of a vehicle, smart home appliance, consumer electronics product or equipment, manufacturing equipment). As used herein, the term "computing system" includes computing devices and includes systems comprising multiple discrete physical components. In some embodiments, the computing systems are located in a data center, such as an enterprise data center (e.g., a data center owned and operated by a company and typically located on company premises), managed services data center (e.g., a data center managed by a third party on behalf of a company), a colocated data center (e.g., a data center in which data center infrastructure is provided by the data center host and a company provides and manages their own data center components (servers, etc.)), cloud data center (e.g., a data center operated by a cloud services provider that host companies applications and data), and an edge data center (e.g., a data center, typically having a smaller footprint than other data center types, located close to the geographic area that it serves).

Figure 14:
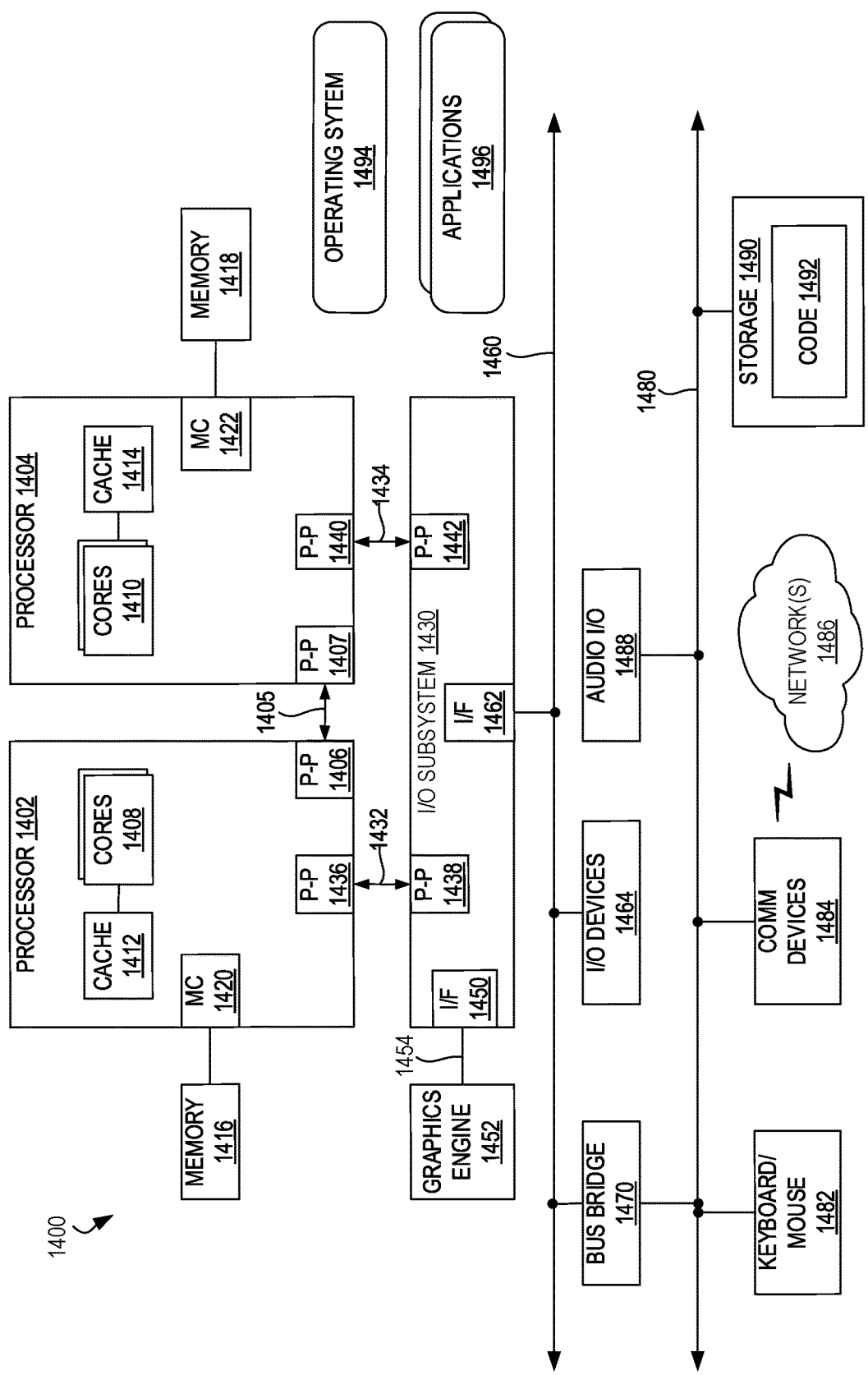
FIG. 14 is a block diagram of a second example computing system in which technologies described herein may be implemented.

FIG. 14 is a block diagram of a second example computing system in which technologies described herein may be implemented. Generally, components shown in FIG. 14 can communicate with other shown components, although not all connections are shown, for ease of illustration. The computing system 1400 is a multiprocessor system comprising a first processor unit 1402 and a second processor unit 1404 comprising point-to-point (P-P) interconnects. A point-to-point (P-P) interface 1406 of the processor unit 1402 is coupled to a point-to-point interface 1407 of the processor unit 1404 via a point-to-point interconnection 1405. It is to be understood that any or all of the point-to-point interconnects illustrated in FIG. 14 can be alternatively implemented as a multi-drop bus, and that any or all buses illustrated in FIG. 14 could be replaced by point-to-point interconnects.

The processor units 1402 and 1404 comprise multiple processor cores. Processor unit 1402 comprises processor cores 1408 and processor unit 1404 comprises processor cores 1410. Processor cores 1408 and 1410 can execute computer-executable instructions in a manner similar to that discussed below in connection with FIG. 15, or other manners.

Processor units 1402 and 1404 further comprise cache memories 1412 and 1414, respectively. The cache memories 1412 and 1414 can store data (e.g., instructions) utilized by one or more components of the processor units 1402 and 1404, such as the processor cores 1408 and 1410. The cache memories 1412 and 1414 can be part of a memory hierarchy for the computing system 1400. For example, the cache memories 1412 can locally store data that is also stored in a memory 1416 to allow for faster access to the data by the processor unit 1402. In some embodiments, the cache memories 1412 and 1414 can comprise multiple cache levels, such as level 1 (L1), level 2 (L2), level 3 (L3), level 4 (L4) and/or other caches or cache levels. In some embodiments, one or more levels of cache memory (e.g., L2, L3, L4) can be shared among multiple cores in a processor unit or among multiple processor units in an integrated circuit component. In some embodiments, the last level of cache memory on an integrated circuit component can be referred to as a last level cache (LLC). One or more of the higher levels of cache levels (the smaller and faster caches) in the memory hierarchy can be located on the same integrated circuit die as a processor core and one or more of the lower cache levels (the larger and slower caches) can be located on an integrated circuit dies that are physically separate from the processor core integrated circuit dies.

Although the computing system 1400 is shown with two processor units, the computing system 1400 can comprise any number of processor units. Further, a processor unit can comprise any number of processor cores. A processor unit can take various forms such as a central processing unit (CPU), a graphics processing unit (GPU), general-purpose GPU (GPGPU), accelerated processing unit (APU), field-programmable gate array (FPGA), neural network processing unit (NPU), data processor unit (DPU), accelerator (e.g., graphics accelerator, digital signal processor (DSP), compression accelerator, artificial intelligence (AI) accelerator), controller, or other types of processing units. As such, the processor unit can be referred to as an XPU (or xPU). Further, a processor unit can comprise one or more of these various types of processing units. In some embodiments, the computing system comprises one processor unit with multiple cores, and in other embodiments, the computing system comprises a single processor unit with a single core. As used herein, the terms "processor unit" and "processing unit" can refer to any processor, processor core, component, module, engine, circuitry, or any other processing element described or referenced herein.

In some embodiments, the computing system 1400 can comprise one or more processor units that are heterogeneous or asymmetric to another processor unit in the computing system. There can be a variety of differences between the processing units in a system in terms of a spectrum of metrics of merit including architectural, microarchitectural, thermal, power consumption characteristics, and the like. These differences can effectively manifest themselves as asymmetry and heterogeneity among the processor units in a system.

The processor units 1402 and 1404 can be located in a single integrated circuit component (such as a multi-chip package (MCP) or multi-chip module (MCM)) or they can be located in separate integrated circuit components. An integrated circuit component comprising one or more processor units can comprise additional components, such as embedded DRAM, stacked high bandwidth memory (HBM), shared cache memories (e.g., L3, L4, LLC), input/output (I/O) controllers, or memory controllers. Any of the additional components can be located on the same integrated circuit die as a processor unit, or on one or more integrated circuit dies separate from the integrated circuit dies comprising the processor units. In some embodiments, these separate integrated circuit dies can be referred to as "chiplets". In some embodiments where there is heterogeneity or asymmetry among processor units in a computing system, the heterogeneity or asymmetric can be among processor units located in the same integrated circuit component. In embodiments where an integrated circuit component comprises multiple integrated circuit dies, interconnections between dies can be provided by the package substrate, one or more silicon interposers, one or more silicon bridges embedded in the package substrate (such as Intel® embedded multi-die interconnect bridges (EMIBs)), or combinations thereof.

Processor units 1402 and 1404 further comprise memory controller logic (MC) 1420 and 1422. As shown in FIG. 14, MCs 1420 and 1422 control memories 1416 and 1418 coupled to the processor units 1402 and 1404, respectively. The memories 1416 and 1418 can comprise various types of volatile memory (e.g., dynamic random-access memory (DRAM), static random-access memory (SRAM)) and/or non-volatile memory (e.g., flash memory, chalcogenide-based phase-change non-volatile memories), and comprise one or more layers of the memory hierarchy of the computing system. While MCs 1420 and 1422 are illustrated as being integrated into the processor units 1402 and 1404, in alternative embodiments, the MCs can be external to a processor unit.

Processor units 1402 and 1404 are coupled to an Input/Output (I/O) subsystem 1430 via point-to-point interconnections 1432 and 1434. The point-to-point interconnection 1432 connects a point-to-point interface 1436 of the processor unit 1402 with a point-to-point interface 1438 of the I/O subsystem 1430, and the point-to-point interconnection 1434 connects a point-to-point interface 1440 of the processor unit 1404 with a point-to-point interface 1442 of the I/O subsystem 1430. Input/Output subsystem 1430 further includes an interface 1450 to couple the I/O subsystem 1430 to a graphics engine 1452. The I/O subsystem 1430 and the graphics engine 1452 are coupled via a bus 1454.

The Input/Output subsystem 1430 is further coupled to a first bus 1460 via an interface 1462. The first bus 1460 can be a Peripheral Component Interconnect Express (PCIe) bus or any other type of bus. Various I/O devices 1464 can be coupled to the first bus 1460. A bus bridge 1470 can couple the first bus 1460 to a second bus 1480. In some embodiments, the second bus 1480 can be a low pin count (LPC) bus. Various devices can be coupled to the second bus 1480 including, for example, a keyboard/mouse 1482, audio I/O devices 1488, and a storage device 1490, such as a hard disk drive, solid-state drive, or another storage device for storing computer-executable instructions (code) 1492 or data. The code 1492 can comprise computer-executable instructions for performing methods described herein. Additional components that can be coupled to the second bus 1480 include communication device(s) 1484, which can provide for communication between the computing system 1400 and one or more wired or wireless networks 1486 (e.g. Wi-Fi, cellular, or satellite networks) via one or more wired or wireless communication links (e.g., wire, cable, Ethernet connection, radio-frequency (RF) channel, infrared channel, Wi-Fi channel) using one or more communication standards (e.g., IEEE 1402.11 standard and its supplements).

In embodiments where the communication devices 1484 support wireless communication, the communication devices 1484 can comprise wireless communication components coupled to one or more antennas to support communication between the computing system 1400 and external devices. The wireless communication components can support various wireless communication protocols and technologies such as Near Field Communication (NFC), IEEE 1402.11 (Wi-Fi) variants, WiMax, Bluetooth, Zigbee, 4G Long Term Evolution (LTE), Code Division Multiplexing Access (CDMA), Universal Mobile Telecommunication System (UMTS) and Global System for Mobile Telecommunication (GSM), and 5G broadband cellular technologies. In addition, the wireless modems can support communication with one or more cellular networks for data and voice communications within a single cellular network, between cellular networks, or between the computing system and a public switched telephone network (PSTN).

The system 1400 can comprise removable memory such as flash memory cards (e.g., SD (Secure Digital) cards), memory sticks, Subscriber Identity Module (SIM) cards). The memory in system 1400 (including caches 1412 and 1414, memories 1416 and 1418, and storage device 1490) can store data and/or computer-executable instructions for executing an operating system 1494 and application programs 1496. Example data includes web pages, text messages, images, sound files, and video to be sent to and/or received from one or more network servers or other devices by the system 1400 via the one or more wired or wireless networks 1486, or for use by the system 1400. The system 1400 can also have access to external memory or storage (not shown) such as external hard drives or cloud-based storage.

The operating system 1494 can control the allocation and usage of the components illustrated in FIG. 14 and support the one or more application programs 1496. The application programs 1496 can include common computing system applications (e.g., email applications, calendars, contact managers, web browsers, messaging applications) as well as other computing applications.

In some embodiments, a hypervisor (or virtual machine manager) operates on the operating system 1494 and the application programs 1496 operate within one or more virtual machines operating on the hypervisor. In these embodiments, the hypervisor is a type-2 or hosted hypervisor as it is running on the operating system 1494. In other hypervisor-based embodiments, the hypervisor is a type-1 or "bare-metal" hypervisor that runs directly on the platform resources of the computing system 1494 without an intervening operating system layer.

In some embodiments, the applications 1496 can operate within one or more containers. A container is a running instance of a container image, which is a package of binary images for one or more of the applications 1496 and any libraries, configuration settings, and any other information that one or more applications 1496 need for execution. A container image can conform to any container image format, such as Docker®, Appc, or LXC container image formats. In container-based embodiments, a container runtime engine, such as Docker Engine, LXU, or an open container initiative (OCI)-compatible container runtime (e.g., Railcar, CRI-O) operates on the operating system (or virtual machine monitor) to provide an interface between the containers and the operating system 1494. An orchestrator can be responsible for management of the computing system 1400 and various container-related tasks such as deploying container images to the computing system 1494, monitoring the performance of deployed containers, and monitoring the utilization of the resources of the computing system 1494.

The computing system 1400 can support various additional input devices, such as a touchscreen, microphone, monoscopic camera, stereoscopic camera, trackball, touchpad, trackpad, proximity sensor, light sensor, electrocardiogram (ECG) sensor, PPG (photoplethysmogram) sensor, galvanic skin response sensor, and one or more output devices, such as one or more speakers or displays. Other possible input and output devices include piezoelectric and other haptic I/O devices. Any of the input or output devices can be internal to, external to, or removably attachable with the system 1400. External input and output devices can communicate with the system 1400 via wired or wireless connections.

In addition, the computing system 1400 can provide one or more natural user interfaces (NUIs). For example, the operating system 1494 or applications 1496 can comprise speech recognition logic as part of a voice user interface that allows a user to operate the system 1400 via voice commands. Further, the computing system 1400 can comprise input devices and logic that allows a user to interact with computing the system 1400 via body, hand or face gestures. For example, a user's hand gestures can be detected and interpreted to provide input to a gaming application.

The system 1400 can further include at least one input/output port comprising physical connectors (e.g., USB, IEEE 1394 (FireWire), Ethernet, RS-232), a power supply (e.g., battery), a global satellite navigation system (GNSS) receiver (e.g., GPS receiver); a gyroscope; an accelerometer; and/or a compass. A GNSS receiver can be coupled to a GNSS antenna. The computing system 1400 can further comprise one or more additional antennas coupled to one or more additional receivers, transmitters, and/or transceivers to enable additional functions.

In addition to those already discussed, integrated circuit components, integrated circuit constituent components, and other components in the computing system 1494 can communicate with interconnect technologies such as Intel® QuickPath Interconnect (QPI), Intel® Ultra Path Interconnect (UPI), Computer Express Link (CXL), cache coherent interconnect for accelerators (CCIX®), serializer/deserializer (SERDES), Nvidia® NVLink, ARM Infinity Link, Gen-Z, or Open Coherent Accelerator Processor Interface (OpenCAPI). Other interconnect technologies may be used and a computing system 1494 may utilize more or more interconnect technologies.

It is to be understood that FIG. 14 illustrates only one example computing system architecture. Computing systems based on alternative architectures can be used to implement technologies described herein. For example, instead of the processors 1402 and 1404 and the graphics engine 1452 being located on discrete integrated circuits, a computing system can comprise an SoC (system-on-a-chip) integrated circuit incorporating multiple processors, a graphics engine, and additional components. Further, a computing system can connect its constituent component via bus or point-to-point configurations different from that shown in FIG. 14. Moreover, the illustrated components in FIG. 14 are not required or all-inclusive, as shown components can be removed and other components added in alternative embodiments.

Figure 15:
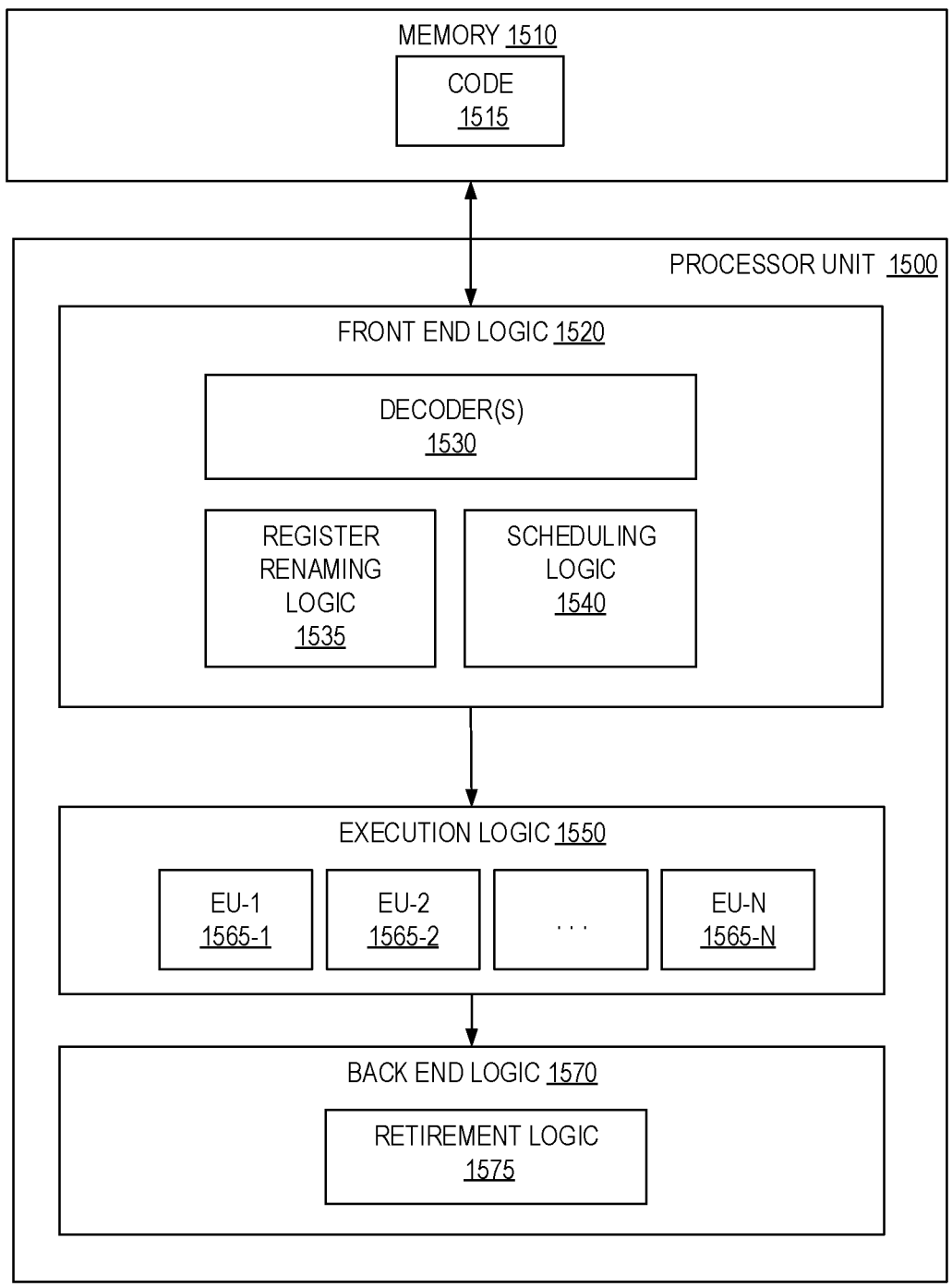
FIG. 15 is a block diagram of an example processor unit to execute computer-executable instructions as part of implementing technologies described herein.

FIG. 15 is a block diagram of an example processor unit 1500 to execute computer-executable instructions as part of implementing technologies described herein. The processor unit 1500 can be a single-threaded core or a multithreaded core in that it may include more than one hardware thread context (or "logical processor") per processor unit.

FIG. 15 also illustrates a memory 1510 coupled to the processor unit 1500. The memory 1510 can be any memory described herein or any other memory known to those of skill in the art. The memory 1510 can store computer-executable instructions 1515 (code) executable by the processor unit 1500.

The processor unit comprises front-end logic 1520 that receives instructions from the memory 1510. An instruction can be processed by one or more decoders 1530. The decoder 1530 can generate as its output a micro-operation such as a fixed width micro operation in a predefined format, or generate other instructions, microinstructions, or control signals, which reflect the original code instruction. The front-end logic 1520 further comprises register renaming logic 1535 and scheduling logic 1540, which generally allocate resources and queues operations corresponding to converting an instruction for execution.

The processor unit 1500 further comprises execution logic 1550, which comprises one or more execution units (EUs) 1565-1 through 1565-N. Some processor unit embodiments can include a number of execution units dedicated to specific functions or sets of functions. Other embodiments can include only one execution unit or one execution unit that can perform a particular function. The execution logic 1550 performs the operations specified by code instructions. After completion of execution of the operations specified by the code instructions, back-end logic 1570 retires instructions using retirement logic 1575. In some embodiments, the processor unit 1500 allows out of order execution but requires in-order retirement of instructions. Retirement logic 1575 can take a variety of forms as known to those of skill in the art (e.g., re-order buffers or the like).

The processor unit 1500 is transformed during execution of instructions, at least in terms of the output generated by the decoder 1530, hardware registers and tables utilized by the register renaming logic 1535, and any registers (not shown) modified by the execution logic 1550.

As used herein, the term "module" refers to logic that may be implemented in a hardware component or device, software or firmware running on a processor unit, or a combination thereof, to perform one or more operations consistent with the present disclosure. Software and firmware may be embodied as instructions and/or data stored on non-transitory computer-readable storage media. As used herein, the term "circuitry" can comprise, singly or in any combination, non-programmable (hardwired) circuitry, programmable circuitry such as processor units, state machine circuitry, and/or firmware that stores instructions executable by programmable circuitry. Modules described herein may, collectively or individually, be embodied as circuitry that forms a part of a computing system. Thus, any of the modules can be implemented as circuitry. A computing system referred to as being programmed to perform a method can be programmed to perform the method via software, hardware, firmware, or combinations thereof.

Any of the disclosed methods (or a portion thereof) can be implemented as computer-executable instructions or a computer program product. Such instructions can cause a computing system or one or more processor units capable of executing computer-executable instructions to perform any of the disclosed methods. As used herein, the term "computer" refers to any computing system, device, or machine described or mentioned herein as well as any other computing system, device, or machine capable of executing instructions. Thus, the term "computer-executable instruction" refers to instructions that can be executed by any computing system, device, or machine described or mentioned herein as well as any other computing system, device, or machine capable of executing instructions.

The computer-executable instructions or computer program products as well as any data created and/or used during implementation of the disclosed technologies can be stored on one or more tangible or non-transitory computer-readable storage media, such as volatile memory (e.g., DRAM, SRAM), non-volatile memory (e.g., flash memory, chalcogenide-based phase-change non-volatile memory) optical media discs (e.g., DVDs, CDs), and magnetic storage (e.g., magnetic tape storage, hard disk drives). Computer-readable storage media can be contained in computer-readable storage devices such as solid-state drives, USB flash drives, and memory modules. Alternatively, any of the methods disclosed herein (or a portion) thereof may be performed by hardware components comprising non-programmable circuitry. In some embodiments, any of the methods herein can be performed by a combination of non-programmable hardware components and one or more processing units executing computer-executable instructions stored on computer-readable storage media.

The computer-executable instructions can be part of, for example, an operating system of the computing system, an application stored locally to the computing system, or a remote application accessible to the computing system (e.g., via a web browser). Any of the methods described herein can be performed by computer-executable instructions performed by a single computing system or by one or more networked computing systems operating in a network environment. Computer-executable instructions and updates to the computer-executable instructions can be downloaded to a computing system from a remote server.

Further, it is to be understood that implementation of the disclosed technologies is not limited to any specific computer language or program. For instance, the disclosed technologies can be implemented by software written in C++, C#, Java, Perl, Python, JavaScript, Adobe Flash, C#, assembly language, or any other programming language. Likewise, the disclosed technologies are not limited to any particular computer system or type of hardware.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, cable (including fiber optic cable), magnetic communications, electromagnetic communications (including RF, microwave, ultrasonic, and infrared communications), electronic communications, or other such communication means.

As used in this application and the claims, a list of items joined by the term "and/or" can mean any combination of the listed items. For example, the phrase "A, B and/or C" can mean A; B; C; A and B; A and C; B and C; or A, B and C. As used in this application and the claims, a list of items joined by the term "at least one of" can mean any combination of the listed terms. For example, the phrase "at least one of A, B or C" can mean A; B; C; A and B; A and C; B and C; or A, B, and C. Moreover, as used in this application and the claims, a list of items joined by the term "one or more of" can mean any combination of the listed terms. For example, the phrase "one or more of A, B and C" can mean A; B; C; A and B; A and C; B and C; or A, B, and C.

The disclosed methods, apparatuses, and systems are not to be construed as limiting in any way. Instead, the present disclosure is directed toward all novel and nonobvious features and aspects of the various disclosed embodiments, alone and in various combinations and subcombinations with one another. The disclosed methods, apparatuses, and systems are not limited to any specific aspect or feature or combination thereof, nor do the disclosed embodiments require that any one or more specific advantages be present or problems be solved.

Theories of operation, scientific principles, or other theoretical descriptions presented herein in reference to the apparatuses or methods of this disclosure have been provided for the purposes of better understanding and are not intended to be limiting in scope. The apparatuses and methods in the appended claims are not limited to those apparatuses and methods that function in the manner described by such theories of operation.

Although the operations of some of the disclosed methods are described in a particular, sequential order for convenient presentation, it is to be understood that this manner of description encompasses rearrangement, unless a particular ordering is required by specific language set forth herein. For example, operations described sequentially may in some cases be rearranged or performed concurrently. Moreover, for the sake of simplicity, the attached figures may not show the various ways in which the disclosed methods can be used in conjunction with other methods.

The following examples pertain to additional embodiments of technologies disclosed herein.

Example 1 is a method comprising: receiving, by a system management mode (SMM) resiliency manager (SRM), a system management interrupt (SMI); implementing, by the SRM, an SMM shim protection policy to protect an SMM shim in response to receiving the SMI; implementing, by the SMM shim, a system resource protection policy to protect one or more resources of a computing system during handling of the SMI by an SMI handler operating; and handling, by the SMI handler, the SMI, wherein the SRM, SMM shim, and the SMI handler are operating on the computing system.

Example 2 comprises the method of Example 1, wherein the implementing the SMM shim protection policy comprises the SRM configuring a page table to allow read-only access to memory pages storing SMM shim code.

Example 3 comprises the method of Example 1, wherein the implementing the SMM shim protection policy comprises configuring a page table to allow read-only access to memory pages storing SMM resource protection policy data.

Example 4 comprises the method of any one of Examples 1-3, wherein the SMI handler operates at a first privilege level, the SMM shim operates at a second privilege level, the first privilege level lower than the second privilege level.

Example 5 is a method comprising: receiving, by a system management mode (SMM) resiliency manager (SRM) operating on a computing system, a system management interrupt (SMI) indicating an SMM shim is to be updated, the receiving the SMI comprising receiving, by the SRM, an SMM shim update image; verifying, by the SRM, a signature of the SMM shim update image; and updating the SMM shim with the SMM shim update image, wherein the SRM and the SMM shim are operating on a computing system.

Example 6 comprises the method of Example 5, wherein the SMM shim comprises SMM shim policy data, the SMM shim update image comprises updated SMM shim policy data, and updating the SMM shim comprises updating the SMM shim policy data with the updated SMM shim policy data.

Example 7 comprises the method of Example 5 or 6, further comprising implementing, by the SMM shim, a system resource protection policy based on the updated SMM shim policy data.

Example 8 is a method comprising: receiving, by a system management mode (SMM) resiliency manager (SRM) operating on a computing system, a system management interrupt (SMI) indicating an SMI handler is to be updated, the receiving the SMI comprising receiving, by the SRM, an SMI handler update image; implementing, by the SRM, an SRM resource protection policy based on SRM resource protection policy data; and updating, by an SMM shim, an SMI handler based on the SMI handler update image, wherein the SRM, the SMM shim, and the SMI handler are operating on the computing system.

Example 9 comprises the method of Example 8, wherein the SMI handler update image comprises updated SMI handler policy data, the method further comprising: prior to receiving the SMI, the SMM shim implementing an SMM shim resource protection policy based on SMM shim resource protection policy data; deimplementing, by the SMM shim, the SMM shim resource protection policy prior to updating the SMI handler and after implementing the SRM resource protection policy; and implementing, after updating the SMI handler, an updated SMM shim resource protection policy based on the updated SMI handler policy data.

Example 10 comprises the method of Example 8 or 9, wherein the SRM resource protection policy comprises the same as the SMM shim resource protection policy.

Example 11 comprises the method of Example 10, wherein the implementing the SMM shim resource protection policy comprises configuring a page table based on SMM shim resource protection policy data and the implementing the updated SMM shim resource protection policy comprises configuring the page table based on the updated SMI handler policy data.

Example 12 comprises the method of Example 11, wherein the SMI handler is one of a plurality of SMI handlers, the method further comprising, during a boot sequence of the computing system, identifying SMI handler policy data associated individual of the SMI handlers, wherein the SMM shim resource protection policy data comprises the identified SMI policy data associated with the plurality of SMI handlers.

Example 13 comprises the method of any one of Examples 8-12, wherein the SMI handler update image comprises updated SMI handler policy data, the method further comprising: prior to receiving the SMI, the SMM shim implementing an SMM shim resource protection policy based on SMM resource protection shim policy data; deimplementing the SMM shim protection policy, by the SMM shim, prior to updating the SMI handler and after implementing the SRM resource protection policy; updating, by the SMM shim, the SMM shim resource protection policy data based on updated SMI handler policy data in the SMI handler update image; and implementing, after updating the SMI handler, an updated SMM shim resource protection policy based on the updated SMM shim policy data.

Example 14 is a method comprising: receiving, by a system management mode (SMM) resiliency manager (SRM), a system management interrupt (SMI); starting, by the SRM, a preemption timer in response to receiving the SMI; starting, by an SMI handler, handling of the SMI; detecting expiration of the preemption timer; and terminating, by the SRM, the SMI handler in response to detecting expiration of the preemption timer, wherein the SRM, preemption timer, and the SMI handler operate on a computing system.

Example 15 comprises the method of Example 14, wherein the terminating the SMI handler is further in response to determining that the SMI handler was operating in an infinite loop or a deadloop prior to expiration of the preemption timer.

Example 16 comprises the method of Example 14 or 15, wherein the determining that the SMI handler was operating in an infinite loop or a deadloop prior to expiration of the preemption timer is based on an analysis of instruction execution information indicating instructions performed by the SMI handler during handling of the SMI.

Example 17 comprises the method of Example 16, wherein the starting the preemption timer comprises setting the preemption timer to a preemption timer duration based on SRM resource protection policy data.

Example 18 comprises the method of any one of Examples 14-17, further comprising updating the SMI handler to a known good version of the SMI handler.

Example 19 comprises the method of Example 18, further comprising storing, during a boot sequence of the computing system, a version of the SMI handler installed during the boot sequence, as the known good version of the SMI handler.

Example 20 comprises the method of Example 18, further comprising storing, during a runtime of the computing system, a version of the SMI handler operating during the runtime, as the known good version of the SMI handler.

Example 21 comprises the method of any one of Examples 18-20, further comprising creating an active domain and a recovery domain, wherein the known good version of the SMI handler is stored in the recovery domain and the SMI handler operates in the active domain.

Example 22 comprises the method of Example 14-21, further comprising updating an SMM shim to a known good version of the SMM shim.

Example 23 comprises the method of Example 22, further comprising storing, during a boot sequence of the computing system, a version of the SMM shim installed during the boot sequence, as the known good version of the SMM shim.

Example 24 comprises the method of Example 22, further comprising storing, during a runtime of the computing system, a version of the SMM shim operating during the runtime, as the known good version of the SMM shim.

Example 25 comprises the method of any one of Examples 23-24, further comprising creating an active domain and a recovery domain, wherein the known good version of the SMM shim is stored in the recovery domain and the SMM shim operates in the active domain.

Example 26 comprises the method of any one of Examples 1-25, wherein the SMM shim operates at a lower privilege level than the SRM.

Example 27 comprises the method of Example 26, wherein the SMM shim operates at ring 0 privilege level.

Example 28 is a computing system, comprising: one or more processing units; and one or more computer-readable media storing instructions that, when executed, cause the one or more processing units to perform any one of the methods of Examples 1-27.

Example 29 is one or more computer-readable storage media storing computer-executable instructions that, when executed, cause a computer to perform any one of the methods of Examples 1-27.

Example 31 is an apparatus comprising a means to perform any one of the methods of Examples 1-27.

The invention claimed is:

1. One or more computer-readable storage media storing computer-executable instructions that, when executed, cause a computing system to perform a method comprising:
   during a boot sequence of the computing system:
      storing a system management interrupt (SMI) handler in memory of the computing system belonging to an active domain; and
      storing a copy of the SMI handler in memory of the computing system belonging to a recovery domain, wherein the copy of the SMI handler stored in the recovery domain is a known good version of the SMI handler; and
   during a runtime of the computing system, the runtime occurring after the boot sequence:
      receiving, by a system management mode (SMM) resiliency manager (SRM), a system management interrupt (SMI);
      starting, by the SRM, a preemption timer in response to receiving the SMI;
      starting, by the SMI handler, handling of the SMI;
      detecting expiration of the preemption timer;
      terminating, by the SRM, the SMI handler in response to detecting expiration of the preemption timer, wherein the SRM, the preemption timer, and the SMI handler operate on the computing system; and
      in response to detecting expiration of the preemption timer, updating the SMI handler in the active domain by copying the known good version of the SMI handler from the recovery domain to the active domain.

2. The one or more computer-readable storage media of claim 1, wherein the terminating the SMI handler is further in response to determining that the SMI handler was operating in an infinite loop or a deadloop prior to expiration of the preemption timer.

3. The one or more computer-readable storage media of claim 2, wherein the determining that the SMI handler was operating in an infinite loop or a deadloop prior to expiration of the preemption timer is based on an analysis of instruction execution information indicating instructions performed by the SMI handler during handling of the SMI.

4. The one or more computer-readable storage media of claim 1, the method further comprising updating an SMM shim to a known good version of the SMM shim.

5. The one or more computer-readable storage media of claim 4, the method further comprising storing, during a runtime of the computing system, a version of the SMM shim operating during the runtime, as the known good version of the SMM shim.

6. The one or more computer-readable storage media of claim 4, the method further comprising creating an active domain and a recovery domain, wherein the known good version of the SMM shim is stored in the recovery domain and the SMM shim operates in the active domain.

7. The one or more computer-readable storage media of claim 1, wherein the SMI indicates an SMM shim is to be updated, the receiving the SMI comprising receiving, by the SRM, an SMM shim update image; the method further comprising:
    verifying, by the SRM, a signature of the SMM shim update image; and
    updating the SMM shim with the SMM shim update image.

8. The one or more computer-readable storage media of claim 7, wherein the SMM shim comprises SMM shim policy data, the SMM shim update image comprises updated SMM shim policy data, and updating the SMM shim comprises updating the SMM shim policy data with the updated SMM shim policy data.

9. A method comprising:
    during a boot sequence of a computing system:
        storing a system management interrupt (SMI) handler in memory of the computing system belonging to an active domain; and
        storing a copy of the SMI handler in memory of the computing system belonging to a recovery domain, wherein the copy of the SMI handler stored in the recovery domain is a known good version of the SMI handler; and
    during a runtime of the computing system, the runtime occurring after the boot sequence:
        receiving, by a system management mode (SMM) resiliency manager (SRM), a system management interrupt (SMI);
        starting, by the SRM, a preemption timer in response to receiving the SMI;
        starting, by the SMI handler, handling of the SMI;
        detecting expiration of the preemption timer;
        terminating, by the SRM, the SMI handler in response to detecting expiration of the preemption timer, wherein the SRM, the preemption timer, and the SMI handler operate on the computing system; and
        in response to detecting expiration of the preemption timer, updating the SMI handler in the active domain by copying the known good version of the SMI handler from the recovery domain to the active domain.

10. The method of claim 9, wherein the terminating the SMI handler is further in response to determining that the SMI handler was operating in an infinite loop or a deadloop prior to expiration of the preemption timer.

11. The method of claim 10, wherein the determining that the SMI handler was operating in an infinite loop or a deadloop prior to expiration of the preemption timer is based on an analysis of instruction execution information indicating instructions performed by the SMI handler during handling of the SMI.

12. The method of claim 9, further comprising updating an SMM shim to a known good version of the SMM shim.

13. The method of claim 12, further comprising storing, during a runtime of the computing system, a version of the SMM shim operating during the runtime, as the known good version of the SMM shim.

14. The method of claim 12, further comprising creating an active domain and a recovery domain, wherein the known good version of the SMM shim is stored in the recovery domain and the SMM shim operates in the active domain.

15. The method of claim 9, further comprising:
    implementing, by the SRM, an SMM shim protection policy to protect an SMM shim in response to receiving the SMI; and
    implementing, by the SMM shim, a system resource protection policy to protect one or more resources of the computing system during handling of the SMI by the SMI handler.

16. The method of claim 15, wherein SMM shim code is stored in one or more memory pages of one or more computer-readable media of the computing system and implementing the SMM shim protection policy comprises the SRM configuring a page table to allow read-only access to the one or more memory pages storing the SMM shim code.

17. The method of claim 15, wherein SMM resource protection policy data is stored in one or more memory pages of one or more computer-readable media of the computing system and implementing the SMM shim protection policy comprises configuring a page table to allow read-only access to the one or more memory pages storing the SMM resource protection policy data.

18. A computing system comprising:
    one or more processing units; and
    one or more computer-readable storage media storing computer-executable instructions that, when executed, cause the computing system to:
        during a boot sequence of the computing system:
            storing a system management interrupt (SMI) handler in memory of the computing system belonging to an active domain; and
            storing a copy of the SMI handler in memory of the computing system belonging to a recovery domain, wherein the copy of the SMI handler stored in the recovery domain is a known good version of the SMI handler; and
        during a runtime of the computing system, the runtime occurring after the boot sequence:
            receive, by a system management mode (SMM) resiliency manager (SRM), a system management interrupt (SMI);
            start, by the SRM, a preemption timer in response to receiving the SMI;
            start, by the SMI handler, handling of the SMI;
            detect expiration of the preemption timer;
            terminate, by the SRM, the SMI handler in response to detecting expiration of the preemption timer, wherein the SRM, the preemption timer, and the SMI handler operate on the computing system; and in response to detecting expiration of the preemption timer, updating the SMI handler in the active domain by copying the known good version of the SMI handler from the recovery domain to the active domain.

19. The computing system of claim 18, wherein to terminate the SMI handler is further in response to determining that the SMI handler was operating in an infinite loop or a deadloop prior to expiration of the preemption timer.

20. The computing system of claim 18, wherein the computer-executable instructions, when executed, further cause the computing system to:

update an SMM shim to a known good version of the SMM shim;

create the active domain and the recovery domain, wherein the known good version of the SMM shim is stored in the recovery domain and the SMM shim operates in the active domain; and update the SMM shim to a known good version of the SMM shim.

* * * * *